United States Patent [19]

Hansen et al.

[11] Patent Number: 4,727,575
[45] Date of Patent: Feb. 23, 1988

[54] STATE CONTROL FOR A REAL-TIME SYSTEM UTILIZING A NONPROCEDURAL LANGUAGE

[75] Inventors: Terris L. Hansen, Aurora; Wayne E. Hyatt, Glenview; Wu-Hon F. Leung, Downers Grove; Warren A. Montgomery, DeKalb, all of Ill.

[73] Assignee: American Telephone and Telegraph Company and AT&T Bell Laboratories, Murray Hill, N.J.

[21] Appl. No.: 812,931

[22] Filed: Dec. 23, 1985

[51] Int. Cl.$^4$ .................................. H04M 11/00
[52] U.S. Cl. .................................. 379/94; 364/200
[58] Field of Search .................. 379/94; 364/200

[56] References Cited

U.S. PATENT DOCUMENTS

| 3,972,023 | 7/1976 | Bodner et al. | 364/200 |
|---|---|---|---|
| 3,984,817 | 10/1976 | Borbour et al. | 364/200 |
| 4,133,030 | 1/1979 | Huettner et al. | 364/200 |
| 4,291,200 | 9/1981 | Smith | 379/94 |
| 4,447,874 | 5/1984 | Bradley et al. | 364/200 |
| 4,551,581 | 11/1985 | Doughty | 379/94 |
| 4,626,634 | 12/1986 | Brahm et al. | 379/94 |
| 4,653,085 | 3/1987 | Chan et al. | 379/94 |
| 4,656,624 | 4/1987 | Collins et al. | 379/94 X |

OTHER PUBLICATIONS

E. R. Jilek, "Implementation of SDL/PR in a Digital Switching System", Proceedings of the IEEE, Global Telecommunications Conference, Nov. 26-29, 1984, Atlanta, GA, pp. 1004-1007.
John DeTreville, "Phoan: An Intelligent System for Distributed Control Synthesis", Proceedings of ACM, SIGSOFT/SIGPLAN System Engineering Symposium on Practical Software Development Environments, Pittsburgh, PA, Apr. 23-25, 1984.
S. W. Nielsen, "Exchange Software Development at Jutland Telephone", Fifth International Conf. on Software Engineering for Telecommunication Switching Systems, No. 223, Jul. 4-8, 1983.
G. A. Raack et al., "Customer Control of Network Services", IEEE Communications Magazine, vol. 22, No. 10, Oct. 1984, pp. 8-14.
Jerrold M. Ginsparg et al., "Automatic Programming of Communications Software Via Nonprocedural Descriptions", IEEE Transactions on Communications, vol. COM-30, No. 6, Jun. 1982, pp. 1343-1347.
Anders Rockstrom et al., "SDL-CCITT Specification and Description Language ", IEEE Transactions on Communications, vol. COM-30, No. 6, Jun. 1982, pp. 1310-1318.

*Primary Examiner*—Jin F. Ng
*Assistant Examiner*—Matthew E. Connors
*Attorney, Agent, or Firm*—John C. Moran

[57] ABSTRACT

A software system written in a nonprocedural language for controlling a telecommunication system in which an internal software signal is generated when a state is exited and another internal signal is generated when a state is entered to control common operations for the state transitions. For each state, a group of instructions written in the nonprocedural language is autonomously executed in response to the exit signal to perform common exit operations for that particular state. A second group of instruction is autonomously executed in response to the entrance signal to perform common entrance operations for that particular state. Various services performed by the telecommunication system are written in scripts of groups of instructions called triples. Each triple has an event definition defining the signal that the triple will respond to and a state definition defining the state in which the system must be in before the triple can respond. Programmer productivity is increased because when new features are added, the common operations previously performed on exiting and entering a state will continue to be performed plus the programmer can add new functions to be performed upon the entrance or exiting from a state without detailed knowledge of the program implementing the previous services.

19 Claims, 39 Drawing Figures

FIG. 3
SCRIPT: POT

301 {
  state: not idle
  event: origin ($source)
  action: send ($source, busy)
          stop
}

302 {
  state: not idle
  event: query ($source)
  action: send ($source, notidle)
          stop
}

303 {
  state: idle
  event: origin ($source)
  action: $originator <- $source
          send ($source, ringing)
          $otherparty <- $source
          nextstate (ringing)
}

304 {
  state: idle
  event: query ($source)
  action: send ($source, idle)
          stop
}

305 {
  state: ringing
  event: enter
  action: apply (ringing)
          continue
}

306 {
  state: ringing
  event: leave
  action: remove (ringing)
          continue
}

307 {
  state: ringing
  event: disconnect ($source)
  action: if ($source = $otherparty)
          then nextstate (idle)
          else continue
          endif
}

308 {
  state: ringing
  event: offhook
  action: send ($otherparty, answer)
          nextstate (talking)
}

309 {
  state: not (dialing or idle or ringing)
  event: digits
  action: print ("\gA call is in progress.\n")
          stop
}

310 {
  state: outpulsing
  event: onhook
  action: nextstate (idle)
}

311 {
  state: outpulsing
  event: ringing ($otherparty)
  action: nextstate (audible)
}

312 {
  state: outpulsing
  event: busy ($otherparty)
  action: nextstate (busy)
}

313 {
  state: audible
  event: enter
  action: apply (audible)
          continue
}

314 {
  state: audible
  event: leave
  action: remove (audible)
          continue
}

315 {
  state: audible
  event: onhook
  action: send ($otherparty, disconnect)
          nextstate (idle)
}

```
      state:   audible
316 { event:   answer ($otherparty)
      action:  nextstate (talking)

state:   busy
317 { event:   enter
      action:  apply (busytone)
               continue state:   busy
318 { event:   leave
      action:  remove (busytone)
               continue state:   busy
319 { event:   onhook
      action:  nextstate (idle)

state:   talking
320 { event:   enter
      action:  engage ($otherparty)
               continue state:   talking
321 { event:   leave
      action:  disengage
               continue state:   talking
322 { event:   onhook
      action:  send ($otherparty, disconnect)
               nextstate (idle)

state:   talking
323 { event:   disconnect ($source)
      action:  if ($source = $otherparty)
                 then nextstate (disconnect)
                 else continue
               endif state:   disconnect
324 { event:   onhook
      action:  nextstate (idle)

state:   idle
325 { event:   offhook
      action:  nextstate (dialing)

state:   dialing
326 { event:   enter
      action:  apply (dialtone)
               continue state:   dialing
327 { event:   leave
      action:  remove (dialtone)
               continue state:   dialing
328 { event:   onhook
      action:  nextstate (idle)

state:   dialing
329 { event:   digits ($otherparty)
      action:  $originator <- $this
               send ($otherparty, origin)
               nextstate (outpulsing)

state:   idle or ringing
330 { event:   digits
      action:  print ("\gThe phone is not offhook.\n")
               stop
```

FIG. 4

```
500 ┌ script: CF
    │ /* Call Forward */
501 │ state:  all
    │ event:  input ("#", $CFnumber)
    └ action: stop 502 ┌ state:  all
    │ event:  origin ($source)
    │ action: if ($CFnumber != "" and $CFnumber != $source)
    │           then forward ($CFnumber, $source, origin)
    │                print ("\g$source forwarded to $CFnumber at $time\n")
    │                stop
    │           else continue
    └         endif 503 ┌ script: CPI
    └ /* Calling party identification */
504 ┌ state:  all
    │ event:  origin ($source)
    │ action: print ("Call from $source\n")
    └         continue 505 ┌ script: CFA
    └ /* Activate call forwarding at 8:00 on weekdays */
506 ┌ state:  all
    │ event:  time (8:00)
    │ action: if ($day >= 1 and $day <= 5)
    │           then activate (CF)
    │                print ("callforward activated at $time\n")
    └         endif ┌ /* Deactivate call forwarding at 17:00 on weekdays */
    │ state:  all
507 │ event:  time (17:00)
    │ action: if ($day >= 1 and $day <= 5)
    │           then deactivate (CF)
    │                print ("callforward deactivated at $time\n")
    └         endif
```

FIG. 5

FIG. 8
SCRIPT: PODS

801
```
state:  all
event:  activate
action: $data <- $deactivate <- false
```

802
```
state:  not idle
event:  deactivate
action: $deactivate <- true
        stop
```

803
```
state:  idle
event:  enter
action: $data <- false
        if ($deactivate = true)
            then purge
        endif
```

804
```
state:  not (idle or ringing)
event:  offhook or onhook
action: if ($data = true)
            then stop
            else continue
        endif
```

805
```
state:  not idle
event:  rcvmessage ($source, "origin")
action: send ($source, busy)
        stop
```

806
```
state:  idle
event:  rcvmessage ($source, "origin")
action: send ($source, ringing)
        $data <- true
        $originator <- $otherparty <- $source
        nextstate (ringing)
```

807
```
state:  ringing
event:  enter
action: if ($data = true)
            then print ("\gcall from $otherparty\n")
                stop
            else continue
        endif
```

808
```
state:  ringing or audible or talking
event:  disconnect ($source)
action: if ($data = true and $source = $otherparty)
            then print ("$otherparty disconnected\n")
        endif
        continue
```

```
809 ⎧ state:  ringing
    ⎨ event:  input ("connect")
    ⎩ action: if ($data = true)
                then send ($otherparty, answer)
                     nextstate (talking)
              endif 810 ⎧ state:  talking
    ⎨ event:  enter
    ⎩ action: print ("$otherparty connected\n")
              continue 811 ⎧ state:  talking
    ⎨ event:  disconnect ($source)
    ⎩ action: if ($data = true and $source = $otherparty)
                then nextstate (idle)
                else continue
              endif 812 ⎧ state:  talking or audible
    ⎨ event:  input ("disconnect")
    ⎩ action: if ($data = true)
                then send ($otherparty, disconnect)
                     nextstate (idle)
              endif 813 ⎧ state:  outpulsing
    ⎨ event:  input ("disconnect")
    ⎩ action: if ($data = true)
                then nextstate (idle)
              endif 814 ⎧ state:  idle
    ⎨ event:  digits ($otherparty)
    ⎩ action: $data <- true
              $originator <- $this
              sendmessage ($otherparty, "origin")
              nextstate (outpulsing)

816 ⎧ state:  audible
    ⎨ event:  enter
    ⎩ action: if ($data = true)
                then print ("$otherparty alerted\n")
                     stop
                else continue
              endif 817 ⎧ state:  outpulsing or audible
    ⎨ event:  busy ($source)
    ⎩ action: if ($data = true and $source = $otherparty)
                then print ("$otherparty busy\n")
                     nextstate (idle)
                else continue
              endif
```

*FIG. 9*

FORMAT OF COMPILED TRIPLE

- 1500 — NUMBER OF BYTES IN COMPILED TRIPLE
- 1501 — NUMBER OF STATES NAMED IN TRIPLE
- 1503 — ID'S OF NAMED STATES
- 1504 — ID OF NAMED EVENT
- 1505 — INSTRUCTIONS (ACTIONS)
- 1506 — HALT INSTRUCTION CODE

GENERAL INSTRUCTION FORMAT

ARGUMENT CODE ... ARGUMENT CODE | INSTRUCTION CODE

0 OR MORE ARGUMENT CODES

ASSIGN INSTRUCTION

ASSIGN INSTRUCTION | ID OF VARIABLE TO RECEIVE ASSIGNMENT

"SENDMESSAGE" INSTRUCTION

ARGUMENT INSTRUCTION
(LITERALS, VARIABLES:)

SIGNAL ARGUMENT

BRANCH INSTRUCTION

STATE CONTROL FOR A REAL-TIME SYSTEM UTILIZING A NONPROCEDURAL LANGUAGE

CROSS-REFERENCE TO RELATED APPLICATIONS

Concurrently filed herewith and assigned to the same assignee as this application are:

T. L. Hansen, et al., "Control of Real-Time Systems Utilizing a Nonprocedural Language," Ser. No. 812,940; and T. L. Hansen, et al., "Customer Programmable Real-Time System," Ser. No. 812,941.

TECHNICAL FIELD

This invention relates to control of real-time processes and, in particular, to the utilization of automatic procedures upon entering and leaving states of the real-time system as implemented in a nonprocedural programming language.

BACKGROUND OF THE INVENTION

State diagrams are commonly used to define the operations of real-time processes. When a computer system that is executing a language, such as C or Pascal, is being used to control the operations of the real-time process, the program has one set of instructions for each of the possible states and the signals that can be received in those states. While in a given state, the instructions are sequentially executed upon the receipt of individual signals to perform the required control functions. The computer's response to process signals is implicit from the sequence of instructions.

There are languages wherein the states and process signals are explicitly defined, and in which the occurrence of these states and signals causes the execution of specific action instructions. One such language is described in the article by J. M. Ginsparg and R. D. Gorden, "Automatic Programming of Communication Software Via Non-Procedural Description", *IEEE Transactions on Communications*, Vol. COM-30, No. 6, June, 1982. This article discloses a programming language for writing programs to control a telephone switching system. Such programs are written in terms of the possible states of the system, occurrences of events within the system, and actions to be taken when defined events and states occur. After program statements are written in that language, they are then translated to the C programming language and compiled and stored within the computer controlling the telephone switching system. Whereas, this language does allow the statements to explicitly designate the actions to be taken in response to a given event, no provision is made for performing common actions that are required upon entering or leaving a state, regardless of individual state transitions. Without provision for performance of such common actions, the resulting programs become complex and difficult to modify.

Another approach is the Specification and Description Language, SDL, that is currently being defined by a CCITT committee. The SDL language is described in the article, "SDL-CCITT Specification and Description Language," *IEEE Transactions on Communications*, Vol. Com-30, No. 6, June, 1982, by A. Rockstrom and R. Saracco, and the CCITT specifications are set forth in Recommendations Z101-104, *CCITT Yellow Book*, International Telecommunication Union, Geneva, Switzerland, 1981. The SDL language allows a formal description of services and features in terms of state and telecommunication signal information. Manufacturers of telecommunication systems then implement that formal description in the language of their choice, such as CHILL or C. The SDL description itself is not directly compiled. In addition, SDL does not provide for the execution of common actions upon entering or leaving a state.

As previously noted, a problem common to both of the previously mentioned prior art methods of utilizing state diagrams in real-time process control is the performance of actions that must commonly be done upon leaving a state and entering a new state, regardless of the particular transition involved, (i.e., the event that motivated the transition). An example of such an action occurs in a telephone system where a customer's telephone is being rung, e.g., it is in the ringing state, and the customer goes off-hook, e.g., an off-hook signal is received. The required actions are to remove the audible ringing indication from the customer's telephone, and upon entering the next state, e.g., talk state, to establish a voice connection to the calling telephone.

In simple telephone service, often referred to as plain old telephone service (POTS), the problem is reasonably easy to solve since the possible ways of going from the ringing state to the talking state are well known at the time of programming POTS service. Problems arise at a future time when it is desired to add new telephone features that will interact with POTS in unforeseen ways. In the prior art programming techniques, the programmer writing such new features needs to fully understand the original code and the interaction of his or her new code with the original code in order to determine all of the ways under which a state could be entered or left. This requirement not only delays the introduction of new features, but makes maintenance of existing programs more difficult.

From the foregoing, it can be seen that there exists a need for a software mechanism that will assure that certain specified actions are taken each time a new state is entered and each time a state is left regardless of the circumstances under which those events occur. Such a mechanism would perform the required operations upon entering the state and the required operations upon leaving the state. In addition, the execution of these required operations should require no additional program statements in any new features being added or even the programmer's knowledge of how these operations are performed. Yet, the programmer should have the ability to modify and add to these operations.

SUMMARY OF THE INVENTION

The foregoing problems are solved and a technical advance is achieved in accordance with the principles of this invention incorporated in an illustrative method and structural embodiment in which groups of instructions nonprocedurally written are directly responsive to state transitional signals and state information to perform common transitional operations regardless of the event causing the state transition in a telecommunication system. Advantageously, the telecommunication system has a plurality of states and a plurality of signals that cause state transitions, and a computer controls the system by executing a program comprising a finite state machine routine and sets of groups of instructions with each set providing a feature on said system and each group responsive to a predefined system state and signal for actuation. The execution of an instruction in a first group of instructions initiates a change from the present state to the next state. The finite state machine routine is responsive to this state transition to generate a leave signal indicating an exit from the present state and an enter signal indicating an entry into the next state. A second group of instructions is responsive to the leave signal and the present state to perform common exit operations to condition the telecommunication system for the termination of the present state. A third group of instructions is responsive to the enter signal and the new state to perform common entrance operations that initialize the telecommunication system for the new state.

Advantageously, in order to promote the later addition of new features to the system, the second group of instructions controls whether another group of instructions is allowed to respond to the leave signal by executing an instruction which either allows the finite state machine routine to continue the processing of the leave signal or terminates this processing. If the processing is continued, a fourth group of instructions is responsive to the leave signal for performing additional common exit operations. If the processing of the leave signal is terminated, the finite state machine routine then begins to process the enter signal. Similarly, each group of instructions responsive to the enter signal can control whether other groups of instructions responsive to the enter signal and the next state are allowed to respond to these conditions.

The illustrative method controls state transitions in a real-time process having a plurality of process states and a plurality of signals causing the state transitions with control being performed by a computer executing a program written in a nonprocedural language. The program provides a plurality of operations each implemented by a set of groups of instructions. Each group of instructions is responsive to a predefined process state and signal for actuation. The method comprises the steps of initiating a change from the present process state to another process state by the execution of an instruction of the first group of instructions, generating a leave signal indicating the exiting from said present state, performing common exit operations before leaving the present state by the execution of a second group of instructions that respond to the leave signal and the present state, generating an enter signal indicating the entry into the next state, and performing common entrance operations upon entering the next state by a third group of instructions that respond to the enter signal and the new state.

Specifically, the method controls state transitions in a voice and data telecommunication system having a plurality of states and signals. The signals actuate the state transitions with the control being performed by a computer executing a program. The program comprises a finite state machine and sets of groups of instructions with each set providing a feature on the system. Each group is actuated by a predefined system state and signal. The computer utilizes a memory for the storage of a plurality of control structures each associated with an individual state. Each of the control structures has a plurality of tables with each table being associated with an individual signal that can occur within the state. The method comprises the steps of maintaining an individual control structure for each of the states, allocating in each of the control structures an individual table corresponding to each signal that can occur in this state, relating individually in each of the tables in preference order groups of instructions actuated by the state and signal corresponding to the individual table, initializing a change from the present state to a new state by execution of a first group of instructions, generating a leave signal by the finite state machine routine responding to the initiated change, identifying a first table in response to the present state and leave signal by execution of the finite state machine routine, executing the group of instructions having highest preference in the first identified table to perform common exit operations, changing from the present state to the new state, generating an enter signal by the execution of the finite state machine routine, identifying a second one of the tables in response to the new state and enter signal, and executing the group of instructions having highest preference in second identified table to perform common entrance operations.

Advantageously, a group of instructions responding to the leave signal can control whether other groups of instructions also actuated by the leave signal and the present state are allowed to respond to these conditions by either continuing or terminating the processing of the leave signal by the finite state machine routine. Similarly, a group of instructions responding to the enter signal can control whether or not other groups of instructions also actuated by the enter signal and the new state are allowed to respond to the enter and new state conditions by continuing or terminating the processing of the enter signal by the finite state machine routine. Since the groups of instructions responding to the enter signal and new state information are stored in the second identified table in preference order, the highest performance group of instructions controls whether or not the lower preference groups of instructions are allowed to respond to the enter signal. The control of the groups of instructions responding to the leave signal and present state is similar to that for the enter signal.

BRIEF DESCRIPTION OF THE DRAWING

FIGS. 3 and 4 illustrate a program script, in source code form, for providing basic telephone service for the telecommunication system of FIG. 1;

FIG. 5 illustrates program scripts for providing call forwarding and calling party identification services with call forwarding activation/deactivation service for the telecommunication system of FIG. 1;

FIG. 8 and 9 illustrate a program script for providing data service for the telecommunication system of FIG. 1;

DETAILED DESCRIPTION

Figure 1:
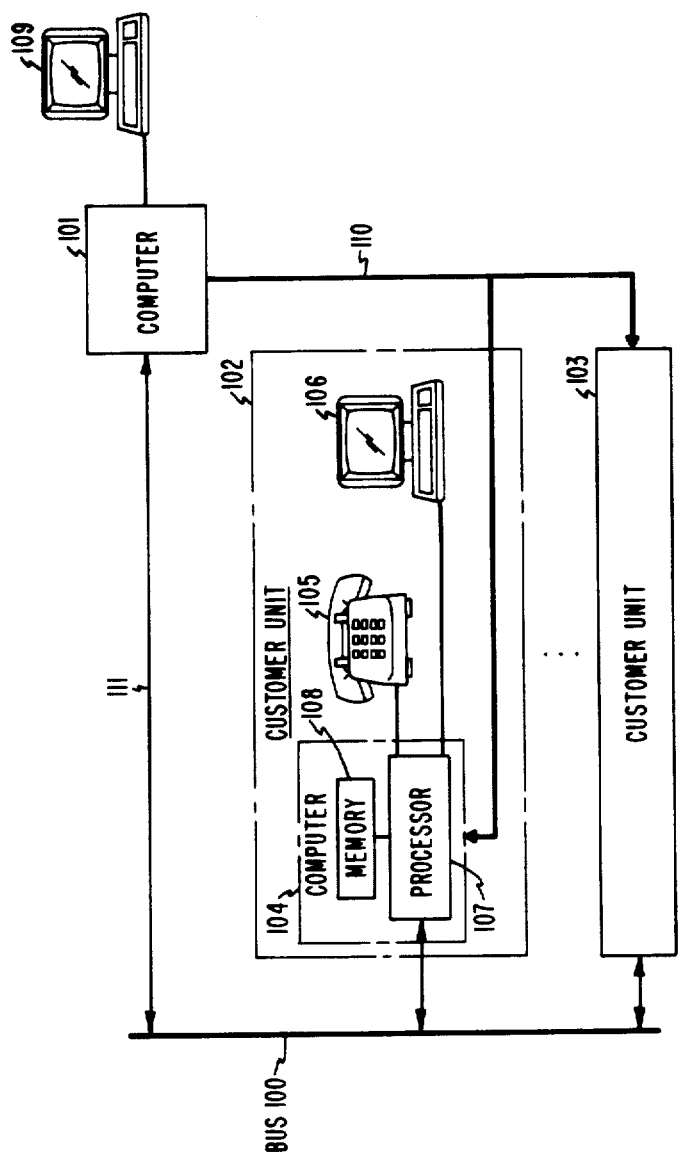
FIG. 1 illustrates, in block diagram form, the telecommunication system that is the subject of this invention.

The software system which is the subject of this invention is advantageously implemented by the hardware system illustrated in FIG. 1. However, it would be obvious to one skilled in the art that other hardware systems are controllable by the illustrative software system. The hardware of FIG. 1 comprises a plurality of customer units 102 through 103. Each customer unit comprises a computer, a telephone handset, and a data terminal. Voice and data information is communicated in the form of packets via bus 100. Bus 100 may advantageously be of the Ethernet ™ type, or it may be a packet switching system as described in U.S. Pat. No. 4,494,230. Customer unit 102 comprises computer 104 which, advantageously, may be of PDP 11 type manufactured by Digital Equipment Corporation, and terminal 106 may advantageously be a Teletype 5410 terminal manufactured by the AT&T Teletype Corporation. Computer 104 contains units not shown for interfacing to bus 100, telephone handset 105, and terminal 106, and for performing the analog-digital conversions utilized for transmitting voice information from and to handset 105 via bus 100.

During the initialization of the system and as required to implement changes in the operation of the customer units, scripts that are written in the nonprocedural language are entered via a terminal to computer 101. Computer 101 compiles these scripts and then downloads interpretable representations of them via bus 110 to the designated customer unit's memory via that unit's processor. Each script comprises a plurality of triples with each triple comprising a state definition, an event definition, and an action definition. The event definition defines which signal actuates the triple and the action definition defines the action to be taken upon the triple actuation. The action definition is made up of a group of instructions. The states and signals that actuate triples for Plain Old Telephone, POT, service are illustrated in FIG. 2.

Figure 2:
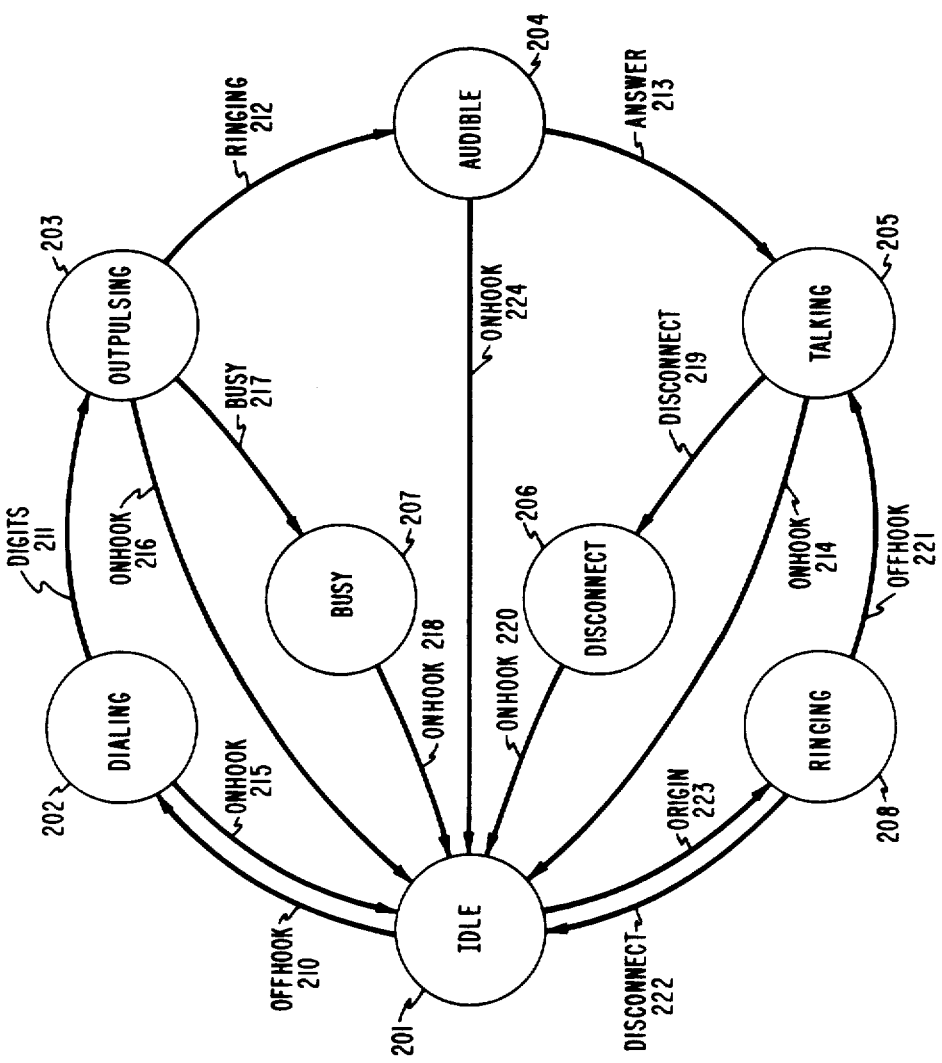
FIG. 2 illustrates, in state diagram form, the states of a customer unit of the telecommunication system of FIG. 1.

FIG. 2 illustrates in state graphic form, the various states 201 through 208 that one of the customer units 102 through 103 may be in at any particular point in time during a line-to-line call. It would be obvious to one skilled in the art to expand the number of illustrated states to meet new system requirements. In addition, to the signals illustrated in FIG. 2, leave and enter signals are generated each time a state transition occurs. Triples actuated by those signals perform common transitional operations regardless of which signal shown on FIG. 2 caused the state transition. Each script can have any number of triples actuated by either those signals. Signals 210 through 224 represent the events whose individual occurrences causes a transition from one state to another state. Again, it would be obvious to one skilled in the art to expand the number of signals to meet new system requirements.

For example, in order to place a call, the customer unit must be initially in idle state 201 and go off-hook. The event of going off-hook places the customer unit in dialing state 202 via off-hook signal 210. After the digits have been collected from the terminal, the state is changed from dialing state 202 to outpulsing state 203 via digits signal 211.

In outpulsing state 203, the customer unit being called is sent a request for a call termination. If the called customer unit is busy, then busy state 207 is entered via busy signal 217. If the calling customer unit goes on-hook while in outpulsing state 203, or dialing state 202 or busy state 207, then the calling customer unit is returned to idle state 201 via either on-hook signal 216, 215, or 218.

If the called customer unit is not busy, then the calling customer unit enters audible state 204 via ringing signal 212. While in the audible state, the calling customer unit hears the ringback tone. If the calling customer unit goes on-hook during audible state 204, it is transferred back to idle state 201 via on-hook signal 224. Once the called customer unit answers the call, the calling customer unit is transferred to talking state 205 via answer signal 213.

Upon entering talking state 205, the calling and called parties exchange voice packets via bus 100. If the called party hangs up first, the calling party is transferred from talking state 205 to disconnect state 206 via disconnect signal 219. If the calling party hangs up first, the calling party is transferred from talking state 205 to idle state 201 via on-hook signal 214.

Consider the previous example from the point of view of the called station. Upon receipt of a message 223 via bus 100 indicating that another customer unit wants to set up a voice connection, the called customer unit is transferred from idle state 201 to ringing state 208 via origin signal 223. While in ringing state 208, the called customer receives an audible ringing indication. If the called customer unit goes off-hook, it is transferred to talking state 205 via off-hook signal 221. If, instead, the calling unit goes on-hook while the called unit is in the ringing state 208, it transmits a disconnect signal contained in a message communicated via bus 100. In response to the disconnect signal, the called customer unit is transferred from the ringing state 208 to idle state 201 via disconnect signal 222.

Turning now to the invention, a script for implementing the transitions from the various states illustrated in FIG. 2 is illustrated in FIGS. 3 and 4. The script implements plain old telephone (POT) service or basic telephone sevice in terms of triples. The latter, once compiled, is stored in memory 108 and executed by processor 107. More details of the language utilized in FIGS. 3 and 4 is given in Appendix A. One skilled in the art can observe from FIGS. 3 and 4 that there is no requirement for ordering the triples. The order of execution is explicitly designated by state and event information and an interscript control mechanism that is implemented during the downloading and activation of the scripts and during execution of the triples.

Consider the example where customer unit 103 is calling customer unit 102. Customer unit 102 is in idle state 201 of FIG. 2. Upon receipt of a message from customer unit 103 containing an origin signal 223 which designates that a call is to be set up, the origin event of triple 303 matches and thus the triple is actuated. The $SOURCE variable is set equal to the telephone number of customer unit 103 by the compiled code for the event definition. The operations to be executed are specified by the action definition of triple 303. First, the information in the $SOURCE variable is transferred to the $ORIGINATOR variable for later use, and a message containing ringing signal 212 is transmitted to customer unit 103 via bus 100 by execution of the SEND primitive to inform customer unit 103 that customer 102 is entering the ringing state. The information in $SOURCE variable is then transferred to $OTHERPARTY variable for later use. The last operation performed is the execution of the NEXTSTATE primitive designating that ringing is to be the next state of customer unit 102. When the state is changed to ringing, the enter signal is generated for ringing state 208. Since the enter signal is generated internal to latter state, it is not illustrated in FIG. 2; but it is explained in detail with respect to FIG. 38. The generation of the enter signal causes triple 305 to be executed. The action definition of triple 305 applies the audible ringing "tone" or "indication" to handset 105.

As illustrated in FIG. 2, customer unit 102 leaves ringing state 208 by either going off-hook causing an off-hook signal 221 to be generated or by receiving a disconnect signal 222 from customer unit 103 via bus 100. The disconnect signal 222 from customer unit 103 indicates that unit 103 has gone on-hook. If customer unit 102 goes off-hook, the off-hook signal 221 is generated, and triple 308 is executed. Triple 308 informs customer unit 103 with a message containing answer signal 213 that customer unit 102 has answered. In addition, the state is changed to talking state 205 by the NEXTSTATE primitive. When the state is changed, the leave signal is generated, and triple 306 is executed whose action definition causes the audible ringing "tone" or "indication" to be removed from handset 105. Since the leave signal is generated internal to ringing state 208, it is not illustrated in FIG. 2; but it is explained in detail with respect to FIG. 38.

If customer unit 102 is in ringing state 208 and receives a disconnect signal 222, then triple 307 is executed. This triple indicates the actions performed by customer unit 102 when calling customer unit 103 goes on-hook. However, no connection has been established at this point. If the message is not from the calling customer unit, customer unit 102 simply continues in the ringing state 208. If the disconnect signal 222 was sent by customer unit 103, then the action definition of triple 307 is executed and the NEXTSTATE primitive moves the system back to idle state 201.

If the signal causing the customer unit 102 to leave the ringing state 208 was an off-hook signal 221, triple 308 causes the answer signal 213 to be transmitted to customer unit 103 and causes customer 102 to enter talking state 205. Upon entering talking state 205, triple 320 of FIG. 4 is executed. The latter triple causes the necessary housekeeping to be performed in computer 104 to establish a voice path via bus 100 to customer unit 103.

When customer unit 102 goes on-hook, triple 322 is executed causing a disconnect signal 219 to be transmitted to customer unit 103 indicating that customer unit 102 has disconnected. In addition, the NEXTSTATE primitive is executed causing customer unit 102 to go to idle state 201. The execution of the NEXTSTATE primitive generates a leave signal resulting in the execution of triple 321. The action definition of triple 321 removes the voice connection to bus 100 for customer unit 102 by the execution of the DISENGAGE primitive.

In order to explore in greater detail the interscript control mechanism and the activation and deactivation of scripts for controlling a customer unit's environment, consider the scripts illustrated in FIG. 5. The illustrated scripts provide call forwarding (CF script), calling party identification (CPI script), and the activation and deactivation of the call forwarding (CFA script) feature. These scripts are compiled by computer 101 and then downloaded to computer 104 of customer unit 102. Computer 104 illustratively stores these scripts so that when the different events specified within the scripts occur, the CF script has precedence over the CPI and CFA scripts.

The call forwarding feature functions by transferring calls intended for customer unit 102 to another customer unit previously identified by the customer entering data via terminal 106. The calling party identification feature displays on terminal 106 which customer unit is attempting to place a call to customer unit 102. For the present example, the call forwarding feature has precedence over the calling party identification. Hence, if the call forwarding feature is active, the calling party identification feature does not display the identification of the calling customer unit since the calling party identification feature is not executed. If call forwarding is not active, then the calling party identification feature identifies all calls that have been placed to customer unit 102 even if the latter is not in the idle state.

The CF script for the call forwarding feature consists of triples 501 and 502 as illustrated in FIG. 5 and demonstrates the interscript precedence mechanism using the STOP and CONTINUE primitives. Triple 501 can be executed in any of the states illustrated in FIG. 2. Triple 501 is actuated by an input signal designating that a "#" has been typed on terminal 106. If such an input signal is generated, then triple 501's event definition sets the $CFNUMBER variable equal to the string of characters that the customer types after "#" on terminal 106. Triple 501's action definition executes the STOP primitive which results in no further processing of the input signal by any other triples from any scripts in any states. The purpose of executing the STOP primitive here is to stop any further processing of the input signal rather than to control interscript precedence.

Assuming that triple 501 has been actuated and that the $CFNUMBER has been set equal to the number for the identified customer unit 103, an origin signal 223 received in any state causes triple 502 to be executed. The execution of triple 502 first results in the $SOURCE variable being set equal to the calling customer unit's number by the event definition. The action definition of trifle 502 then checks to determine that the $CFNUMBER variable has been set equal to a nonnull value and that this value is not equal to the calling customer unit's number. If these conditions are true, then the "then" statement of triple 502's action definition is executed resulting in the FORWARD, PRINT, and STOP primitives being executed. The FORWARD primitive transfers the value of the $SOURCE variable to the identified customer unit along with the origin signal 223 indicating that call origination is being attempted. In addition, the PRINT primitive prints a message out on terminal 106 indicating the time at which the call was transferred to the identified customer unit. Finally, the STOP primitive is executed which inhibits the execution of triples in the CPI and POT scripts that respond to the origin signal in the current state of customer unit 102. The execution of the STOP primitive allows the CF script to inhibit the normal operations that would occur upon an attempt being made to set up a call. The STOP primitive is part of the interscript control mechanism.

If the conditions defined by the "if" statement of triple 502 are not met, then a CONTINUE primitive is executed. The latter's execution results in control being passed to other triples of lower-precedence scripts. In this case, the origin signal 223 will be handled by the CPI and POT scripts. When the CPI script receives the origin signal 223 in any state, the action definition of triple 504 prints out an indication that a call has been received from the customer unit identified in the origin message and then executes the CONTINUE primitive to invoke the operation of the POT script to set up the call. When control is passed to the POT script, the connection is set up as previously described with respect to FIGS. 3 and 4.

Now, consider how the CFA script illustrated in FIG. 5 activates or deactivates the CF script. When the time reaches 8:00 a.m., a time signal is generated, and triple 506 is executed resulting in the CF script being activated if the day of the week is Monday through Friday which are designated as "1" through "5", respectively. At 5:00 p.m., another time signal is generated; and in response, triple 507 is executed and deactivates the CF script if the day of the week is not Saturday or Sunday. Normally, the CF script would have been deactivated on Friday, at 5:00 p.m., if it was Saturday or Sunday.

The compiler illustrated in Appendix C is executed by computer 101 and is responsive to the scripts illustrated on FIGS. 3, 4, and 5, to compile these scripts prior to the transfer of the compiled triple code to illustratively computer 104. The source code of Appendix C is listed in the copending application of T. L. Hansen, et al., Ser. No. 812,940 filed concurrently with the present application and which is hereby incorporated by reference into the present application.

As is described later, when the compiled scripts are downloaded, the activation operation performed in computer 104 establishes the following precedence among the scripts: CFA, CPI, and CF with the CFA script having the highest precedence. In addition, the CFA, CPI, and CF scripts could be compiled at a latter point in time and downloaded. A program in computer 104 is responsive to the compiled triples of these scripts to store these triples as logically illustrated in FIG. 6 for idle, ringing, and talking states, and to provide a method for executing these triples. The triples associated with the other states would be similarly stored. The triples are grouped by their event definitions for each state.

Figure 11:
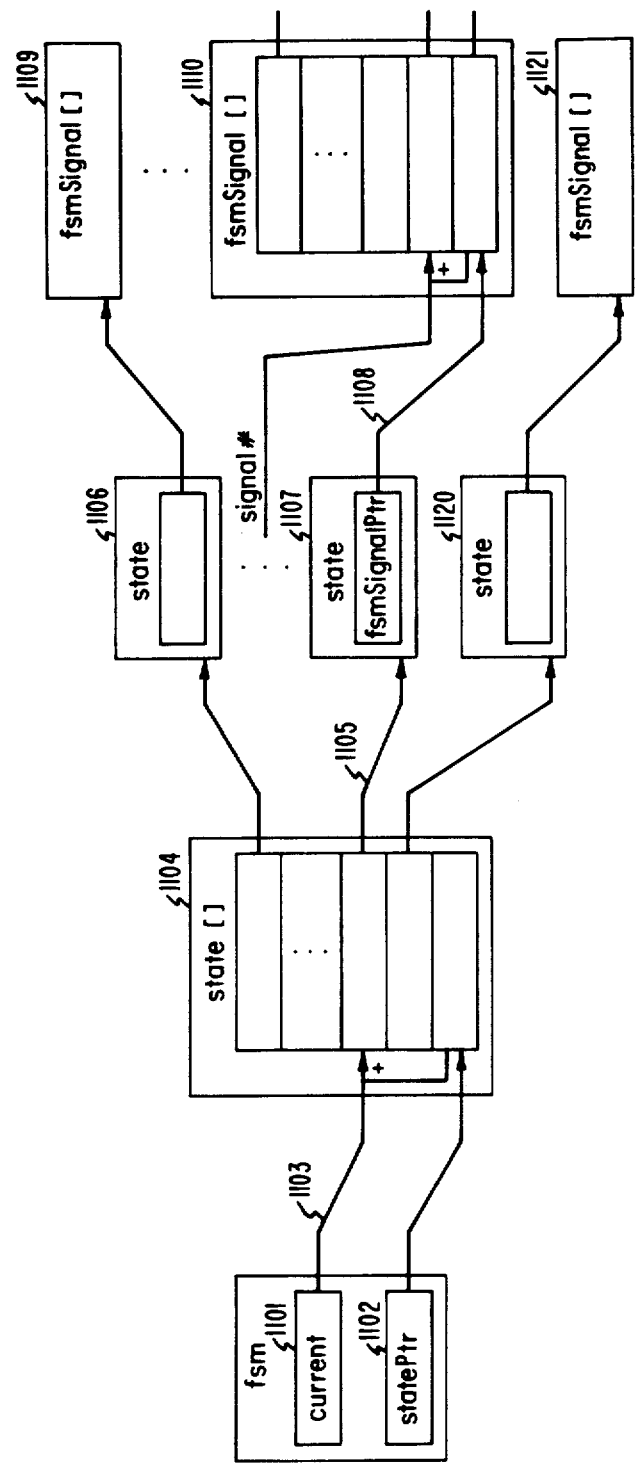
FIGS. 11, 12, amd 13 illustrate software structures that are utilized to implement the logical signal tables of FIGS. 6 and 7.
Figure 12:
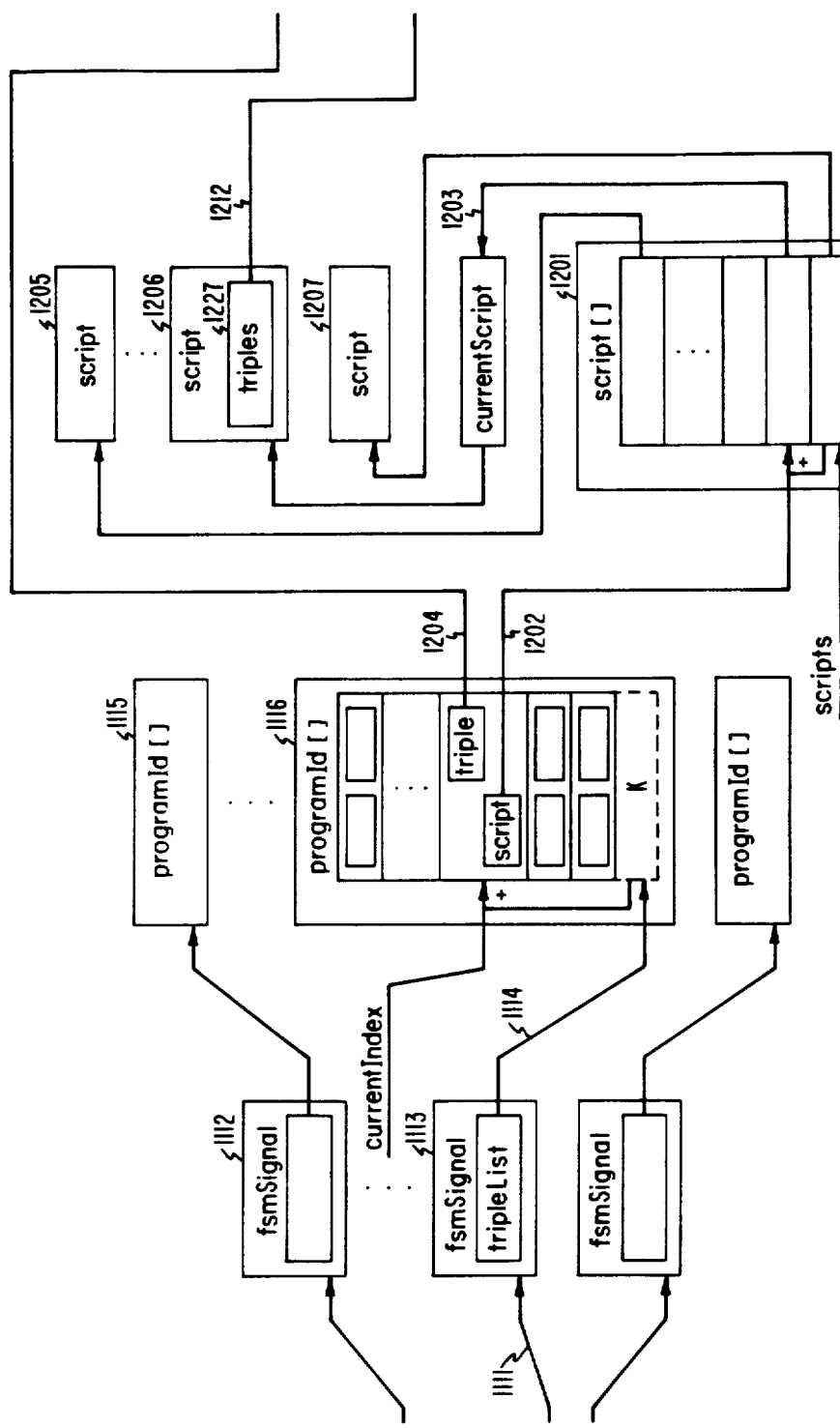
Figure 13:
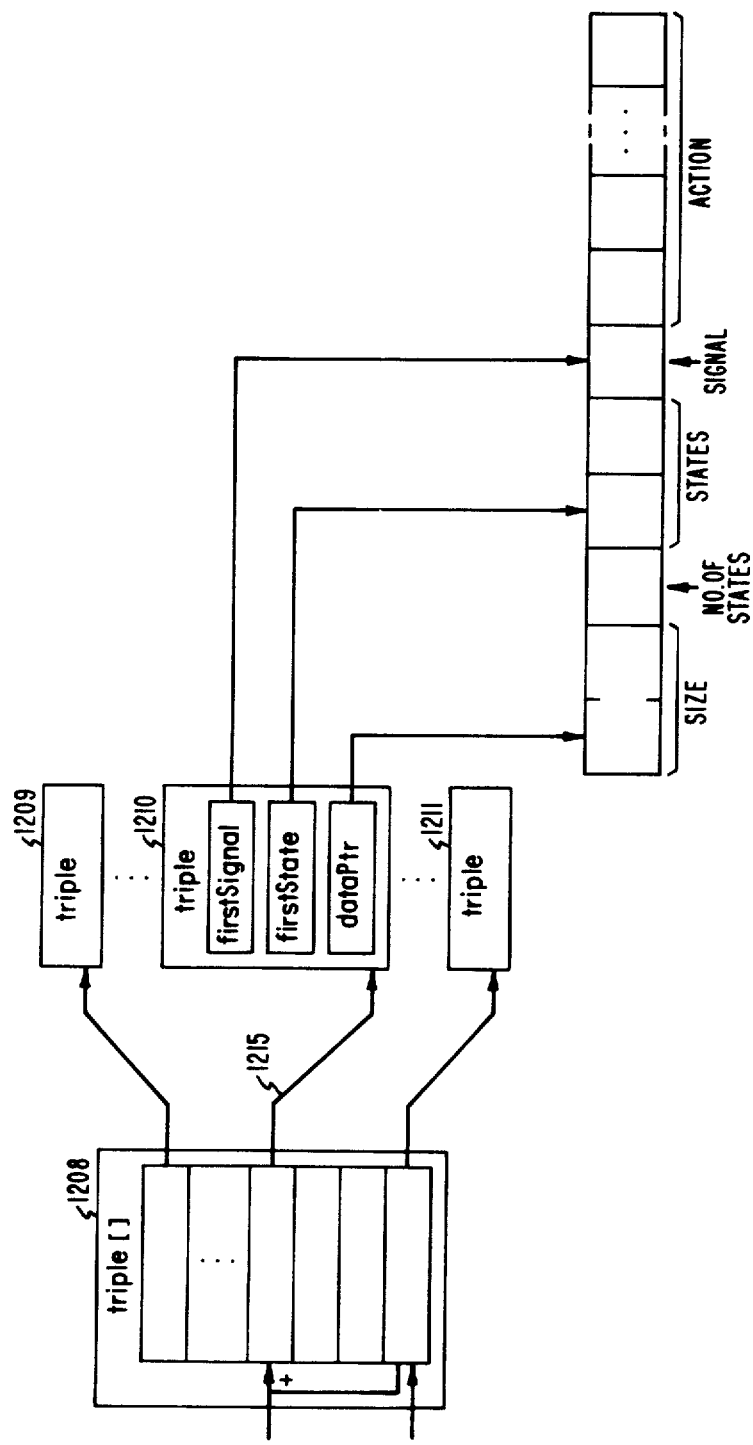

As illustrated in FIGS. 11, 12, and 13, indexing is provided that allows for execution of a triple in response to a signal that corresponds to a particular event definition when the present state corresponds to the state definition. For example, origin signal 223, when received in the idle state 201, can sequentially activate triple 502 of the CF script, triple 504 of the CPI script, and triple 303 of the POT script.

Figure 10:
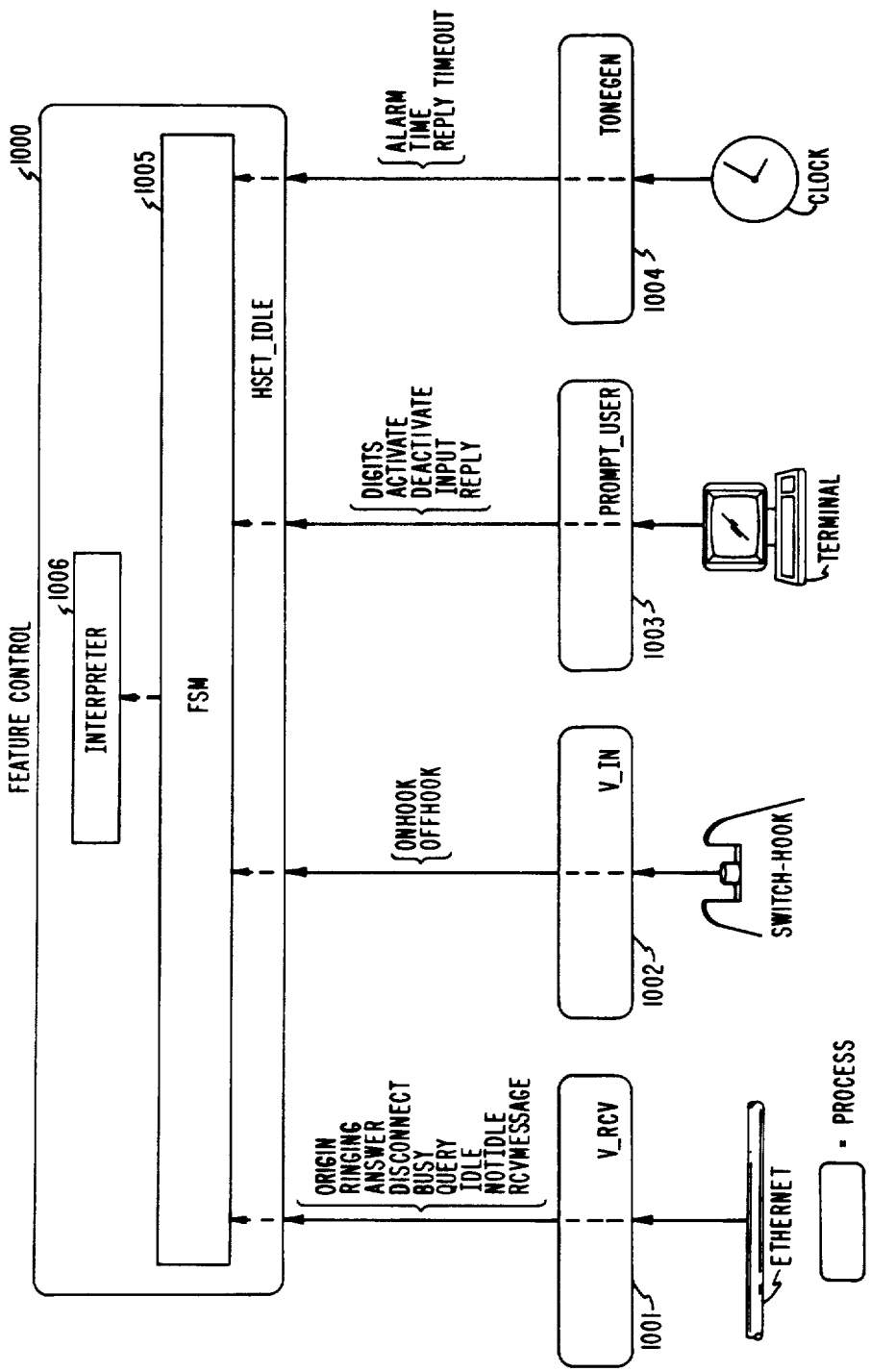
FIG. 10 illustrates in block diagram form, software processes and interprocess communication that is utilized in the control of a customer unit's computer of FIG. 1.
Figure 15:
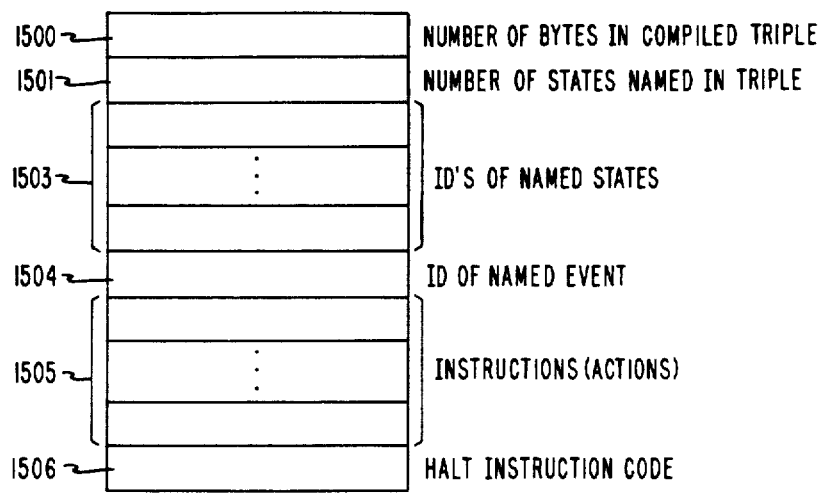
FIG. 15 illustrates the format of a compiled triple that results from compilation of the source code for a triple such as illustrated in FIG. 3.
Figure 16:
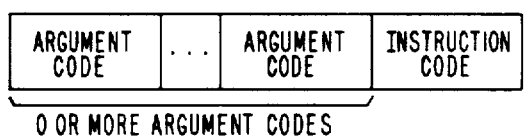
FIGS. 16 through 21 illustrate the various instruction formats used in FIG. 15.

The different processes that are executed in computer 104 to receive the compiled code from computer 101 and to activate, store, and execute this information in the logical manner illustrated in FIG. 15, are illustrated in FIG. 10. The source code for implementing the routines illustrated in FIG. 10 with the exception of interpreter 1006 is illustrated in Appendix F with the source code for interpreter 1006 being illustrated in Appendix D. The source code of Appendices D and F is listed in the copending application of T. L. Hansen, et al., Ser. No. 812,940 filed concurrently with the present application and which is hereby incorporated by reference into the present application.

Also illustrated in the latter figure are the signals communicated between the various processes in the customer units. For example, in the previous discussion, the origin signal 223 transmitted from customer unit 103 to customer unit 102 is received by computer 104 via bus 100 by V_RCV process 1002. The latter process then communicates the origin signal 223 to feature control process 1000 via an operating system call. The execution of these processes is controlled by an operating system that controls the operation of computer 104. The source code for the operating system is illustrated in Appendix E. The source code of Appendix E is listed in the copending application of T. L. Hansen, et al., Ser. No. 812,940 filed concurrently with the present application and which is hereby incorporated by reference into the present application.

For example, if the customer lifts his or her telephone receiver from its cradle (i.e., goes off-hook), a hardware interrupt occurs causing the operating system to send an interrupt message to V_IN process 1002. The latter process responds to the interrupt and determines that the customer has gone off-hook and then transmits the off-hook signal via an operating system call to feature control process 1000. The execution of the operating system call to transfer the off-hook signal to feature control process 1000 results in the operating system executing feature control process 1000.

Once feature control 1000 is invoked, it first determines what signal it has received, determines the present state of the customer unit, and then executes the triples in that state whose event definition matches the received signal. To illustrate how this matching is accomplished, consider the transmission of an origin message 223 via bus 100 from customer unit 103 to customer unit 102. V_RCV process 1001 receives this message and transfers the origin signal to finite state machine (FSM) 1005 of feature control 1000. FSM 1005 is responsive to the origin signal to index into logical signal tables 601 through 606 that are associated with the idle state 201. FSM 1005 then identifies origin logical signal table 602 and has the triples identified by table 602 interpreted by interpreter 1006. The manner in which the indexing is performed on actual physical tables, and the identification of the triples to be executed for a given state and signal are detailed with respect to FIGS. 11, 12 and 13.

After identifying logical signal table 602, FSM 1005 passes a pointer, which is stored in entry CF,502 of table 602, to interpreter 1006 to identify the location of the compiled triple code to be executed. The action implemented by the identified triple code is defined by triple 502 as illustrated on FIG. 5.

Two different sets of operations can result from the execution of triple 502. The first set results if $CFNUMBER variable contains a number and the calling customer unit is not the customer unit to which customer unit 102 is transferring its calls. If the conditions for the first set of operations are met, then the origin signal and the calling customer unit's number are transferred to the designated call forwarding customer unit by execution of the FORWARD primitive. Also, a notification message is printed on data terminal 106, and the STOP primitive is executed. The effect of the STOP primitive is to cause FSM 1005 to cease processing triples in logical signal table 602.

The second set of operations is performed when the conditional portion of the "if" statement of triple 502 is false, causing the "else" portion to be executed. The "else" portion of the "if" statement causes the CONTINUE primitive to be executed which results in FSM 1005 executing the remaining triples in logical signal table 602.

If the CONTINUE primitive is executed, the next triple to be executed in table 602 is triple 504 of FIG. 5 which is pointed to by the CPI,504 entry. The execution of triple 504 results in a message being printed out on terminal 106 identifying the calling customer unit. Next, the CONTINUE primitive is executed which results in the execution of triple 303 as identified by the POT,303 entry in table 602.

The execution of triple 303 results in the identification number of the calling customer unit being savd in $ORIGINATOR and $OTHERPARTY and a message being transmitted to the calling customer unit indicating that the called customer unit is entering the ringing state 208. In addition, the NEXTSTATE primitive is executed, resulting in the leave signal being internally generated, the state being changed to the ringing state, and the enter signal being internally generated within feature control 1000 by FSM 1005. FSM 1005 processes the leave and enter signals in a manner similar to the signals being received from another process such as V_RCV process 1001. Further details on the processing of the leave and enter signals is given with respect to FIG. 38 which illustrates the NEXTSTATE primitive.

The leave signal relates to the idle state 201 in the present example. Since there are no entries in the logical signal table for the leave signal associated with the idle state, no action results from this signal in the present example. The enter signal which relates to the new state, i.e., ringing state 208, causes the compiled code pointed to by entry POT,305 of logical signal table 614 to be executed. This compiled code corresponds to triple 305 illustrated in FIG. 3. The action definition of triple 305 results in the audible ringing tone being applied to handset 105. In addition, the action definition causes the CONTINUE primitive to be executed; however, since there are no more triples to be executed in logical signal table 614, no other triples are executed in response to the enter signal.

If, during the ringing state 208, handset 105 goes off-hook, this fact is detected by V_IN process 1002 and an off-hook signal 221 is transmitted to FSM 1005. The latter process identifies that it has received the off-hook signal and that it is in the ringing state and indexes into logical signal table 608. FSM 1005 accesses the pointer stored in POT,308 and passes this pointer to interpreter 1006 which executes the compiled code for triple 308 as illustrated in FIG. 3. The latter triple transmits the answer signal 213 to the calling customer unit by execution of the SEND primitive, and executes the NEXTSTATE primitive to change the state to the talking state 205. The execution of the NEXTSTATE primitive causes the leave signal to be generated for the ringing state and the enter signal to be generated for the talking state. FSM 1005 is responsive to the leave signal to direct the interpreter 1006 to execute the triple pointed to by entry POT,306 of logical signal table 615. The execution of the compiled code for triple 306 illustrated in FIG. 3 results in the ringing tone being removed from handset 105 of FIG. 1.

In response to the enter signal, FSM 1005 indexes into the logical signal tables 621 through 629 associated with the talking state and identifies the triple pointed to by the contents of the POT,320 entry for enter logical signal table 626. This pointer is passed to interpreter 1006 which executes triple 320 of FIG. 4. The latter triple causes a voice communication path to be set up between the calling customer unit and customer unit 102 by execution of the ENGAGE primitive.

If, during the talking state 205, customer unit 102 goes on-hook, this fact is detected by V_IN 1002 process and an on-hook signal is transmitted to FSM 1005. The latter is responsive to the on-hook signal to identify and pass the pointer to interpreter 1006 contained in POT,322 of logical signal table 628. The latter pointer points to the compiled code for triple 322 as illustrated in FIG. 4. Execution of this compiled code results in the execution of the SEND primitive which transmits the disconnect signal 219 to the calling customer unit and the execution of the NEXTSTATE primitive to change the state to idle 201.

The execution of the NEXTSTATE primitive causes a leave signal to be generated for the talking state 205 and an enter signal to be generated for the idle state 201. FSM 1005 is responsive to the leave signal to identify and pass the pointer to interpreter 1006 contained in logical signal table 627. The latter pointer points to the compiled code for triple 321, as illustrated on FIG. 4. Execution of the latter compiled code results in the voice communication path from customer unit 102 to the calling party being broken. Since there is no enter logical signal table associated with the idle state, the generation of the enter signal has no effect.

In order to illustrate the effect of the activation and deactivation, consider the following example. Assume customer unit 102 is in the talking state when the real-time clock indicates that it is 5:00 p.m. Tonegen process 1004 is responsive to the fact that it is 5:00 p.m. has passed to transmit a time signal to FSM 1005. The latter process is responsive to the time signal to identify time logical signal table 625 associated with the talking state. As will be described in greater detail with respect to FIGS. 23 and 24, FSM 1005 first passes the pointer pointing to the compiled code of triple 506 to interpreter 1006; and after interpreter 1006 has finished processing triple 506, FSM 1005 passes the pointer from logical signal table 625 for triple 507 to interpreter 1006 for execution. The first action of the compiled code for triple 506 is to check whether or not the time is equal to 8:00 a.m., verifying that the event time (8:00) has occurred. Since, in our present example, the time is 5:00 p.m., the event does not match and the action definition of trple 506 is not executed.

Interpreter 1006 returns control to FSM 1005 which then passes the pointer contained in CFA,507 entry of logical signal table 625 that points to triple 507 as illustrated in FIG. 5 to interpreter 1006. The latter is responsive to this pointer to start execution of the compiled code for triple 507. The first part of the compiled code for triple 507, as illustrated in FIG. 5, verifies whether or not the event matches the specified time (17:00) event before proceeding to execute the action definition portion of the triple. Since the time is 5:00 p.m., or 17:00 on a 24-hour time base, and assuming that the day is Monday through Friday, the DEACTIVATE primitive and the PRINT primitive of triple 507 are executed. The DEACTIVATE primitive causes a deactivate signal to be transmitted to FSM 1005 indicating that the CF script is to be deactivated. No actual deactivation takes place at this point in time.

Figure 7:
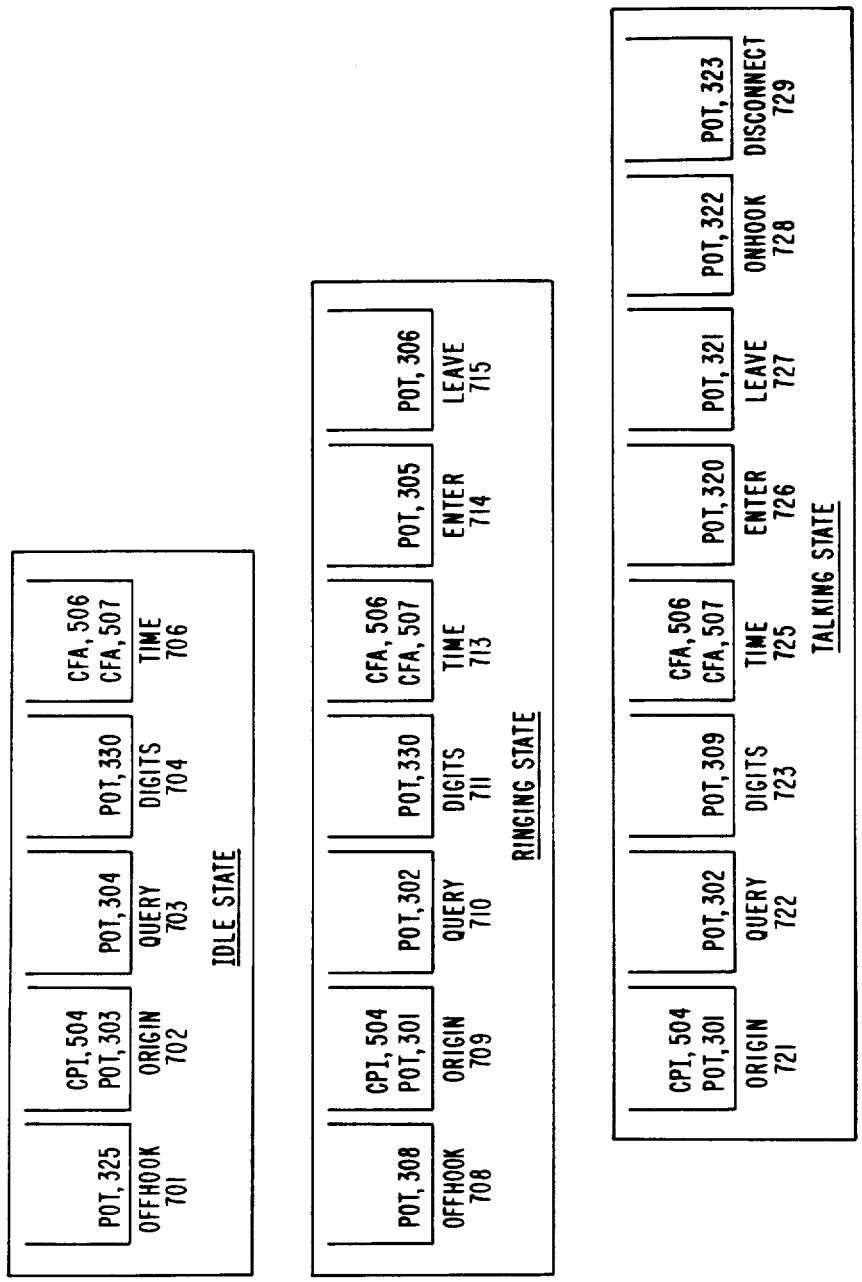
FIG. 7 illustrates the logical signal tables of FIG. 6 upon the call forwarding service having been deactivated.

When FSM 1005 receives the deactivate signal, it processes through all of the states to remove all triples that are part of CF script 500, as illustrated on FIG. 5. This process is described in greater detail with respect to FIGS. 23 through 28. In the present example, the CF script 500 does not have a triple whose event definition is responsive to the deactivate signal so the triples can simply be removed by FSM 1005, thereby completing the actual deactivation of the CF script. After removal of the triples associated with CF script 500, the logical signal tables of the idle, ringing, and talking states contain the pointers to triples as illustrated in FIG. 7. For example, in the idle state, since the reference to the CF triples has been removed, the calling party identification triple is now the first triple executed in logical signal table 702 when an origin signal is received in the idle state.

Figure 6:
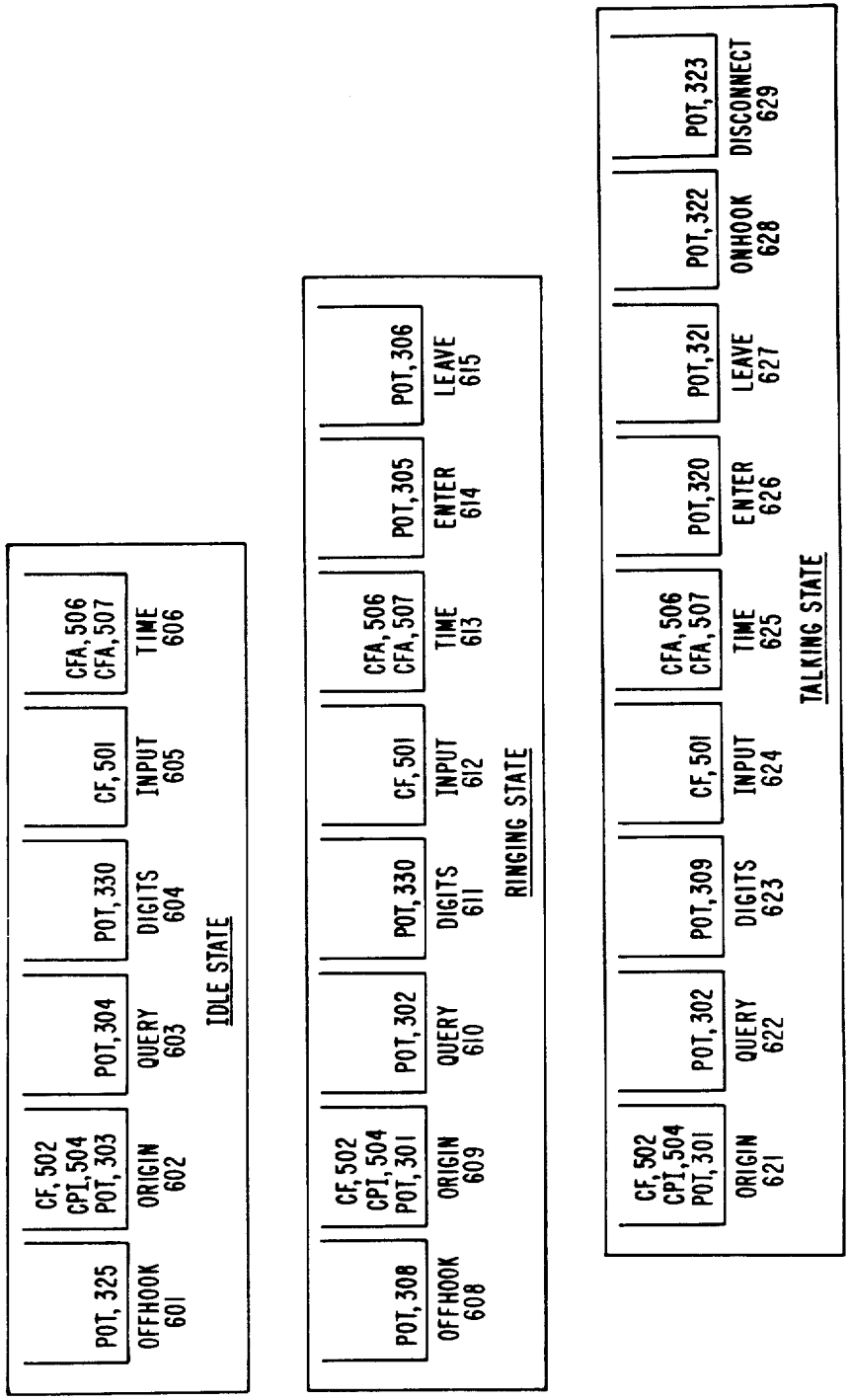
FIG. 6 illustrates logical signal tables with the implementation of call forwarding, calling party identification, and basic telephone services for the telecommunication system of FIG. 1.

It would be obvious to one skilled in the art that the inter-feature precedence could be changed by altering the manner in which the reference to the triples are stored in the logical signal tables of FIG. 6. For example, to allow the calling party identification to have precedence over the call forwarding, the CPI triples would be placed on top of the call forwarding triples in the logical signal tables. For example, in origin logical signal table 602, the order would be CPI,504; CF,502; and POT,303. Similarly, the entries in origin logical signal table 609 and origin logical signal table 621 would be changed.

The PODS script of FIG. 8 illustrates in greater detail, the manner in which a script controls its own deactivation. The latter script is used to provide data service. In addition, the PODS script illustrates the provision of data services for the system illustrated in FIG. 1. When the POT, PODS, CPI, CFA, and CF scripts are compiled and downloaded, they are inserted into the logical signal tables such as illustrated in FIG. 6 such that a logical signal table containing a triple for each script would have a CF triple on the top, followed by a CFA triple, a CPI triple, a PODS triple, and finally, a POT triple. When the PODS script is initially activated, triple 801 is executed in response to an activate signal which results in the $DATA and $DEACTIVATE variables being set equal to false. The $DATA variable indicates whether or not a data call is presently in progress; and the $DEACTIVATE variable indicates whether or not the script is to be purged when the idle state is entered.

The purpose of a PODS data call is to allow a customer to transmit a message that consists of a plurality of packets from the customer's data terminal to another customer's data terminal. However, it would be obvious to one skilled in the art to extend this script such that the transfer was from a customer unit's computer to another customer unit's computer. Once the customer unit has established the data call to the other customer's data terminal, this data call remains operational until the customer disconnects the data call by inputing the word "disconnect".

Consider now, the operation of the PODS script illustrated in FIG. 8 in providing the previously described data call. The customer using, for example, customer unit 102 initially sets up the call by typing a sequence of digits designating the customer unit that is to be called. In response to the entry of digits during the idle state, triple 814 is executed resulting in the $DATA variable being set equal to true, and the $ORIGINATOR variable being set equal to the $THIS variable. The SENDMESSAGE primitive is then used to send an original signal, in the form of a message string, to the party being called, and the NEXTSTATE primitive is utilized to enter the outpulsing state.

During the setup of a voice call, the customer would go off-hook in the idle state and would be placed in the dialing state. While in the dialing state for a voice call, the customer would enter a sequence of digits and this would result in only a voice path being set up. Thus, the system distinguishes between a data call and a voice call by the fact that a data call receives the digits designating the called party during the idle state, whereas the voice call receives digits during the dialing state. The called party distinguishes between the origination of a data call and a voice call by the fact that a SENDMESSAGE is utilized to send the "origin" string in a message for a data call whereas the SEND primitive is used to send the origin signal 223 for a voice call. The called party recognizes those facts by the actuation of rcvmessage and origin events.

Once in the outpulsing state, customer unit 102 leaves by the occurrence of the busy signal, input signal, or the receipt of a ringing message which results in the entry of the idle state, idle state, or audible state, respectively. Triples 817 and 813 illustrate the action definitions performed upon the occurrence of the busy or input signals, respectively. Triple 311, as illustrated in FIG. 3, defines action taken upon receipt of the ringing message signal. When this occurs, the NEXTSTATE primitive is executed moving the customer unit to the audible state.

Upon entry into the audible state, triple 816 is executed resulting in a message being printed out on terminal 106 indicating that the other party has been alerted. While in the audible state, the customer unit can transfer to the idle state either by the occurrence of the input signal with the string "disconnect", or the occurrence of the busy signal from the called customer unit resulting in the execution of triples 812 and 817, respectively. When the called customer unit accepts the data call, the latter unit transmits a message to the calling customer unit utilizing the SEND primitive to send an answer message. In response to the event of the answer message being received by the calling unit, triple 316 of FIG. 3 is executed resulting in customer unit 102 being transferred to the talking state.

Upon entering the talking state, triple 810 is executed resulting in a message being printed out that a connection has been made to the identified called customer unit; and since there is a CONTINUE primitive ending the action definition of triple 810, control is passed to triple 320 of the POT script as illustrated in FIG. 4. The execution of triple 320 causes a voice path to be set up in addition to the data path between the calling and called customer units. The talking state can be exited by the execution of either triple 811 or 812. Both of these triples transfer the calling customer unit from the talking state to the idle state. The voice path is removed by triple 321 as illustrated in FIG. 4 which is responsive to the leave event in the talking state to execute the DISENGAGE primitive.

Consider the establishment of a data call from the point of view of the called customer unit. Upon occurrence of the rcvmessage event having an origin string, triple 806 is executed assuming the called customer unit is in the idle state. Otherwise, triple 805 is executed and a busy signal is sent back to the calling customer unit. The action definition of triple 806 utilizes the SEND primitive to transmit the ringing signal back to the calling customer unit indicating that the called customer unit is entering the ringing state and initializes the $DATA, $ORIGINATOR, $OTHERPARTY variables.

Upon entering the ringing state, triple 807 is executed in the called customer unit and a message is printed out on the associated terminal indicating the party who is calling. The state can be changed to the idle state if the calling party terminates the call setup, indicated by a disconnect signal, which results in the execution of triple 808. The customer at the called customer unit can establish the call by generating an input event with the word "connect" resulting in the execution of triple 809 resulting in the action definition sending an answer signal to the calling customer unit, and changing the state to talking. Upon entering the talking state, triple 810 is executed as illustrated in FIG. 9, and in addition, triple 320 as illustrated in FIG. 4 is executed resulting in a voice path as well as a data path being set up. The talking state is terminated at the called customer unit in the same manner as that previously described from the point of view of the calling customer unit.

Consider now, in greater detail, the manner in which the PODS script is illustrated in FIG. 8 delays its deactivation after the DEACTIVATE command has been executed from the terminal, such as terminal 106 in FIG. 1, specifying that the PODS script is to be deactivated. This delay is to allow the data call to be completed and it is only necessary to delay the deactivation if there is presently a data call in progress. Hence, the state will not be the idle state. Upon the occurrence of the deactivate event and the state not being the idle state, triple 802 is executed resulting in the $DEACTIVATE variable being set equal to true and then the execution of the STOP primitive. As described later with respect to FIGS. 23 and 24, a script indicates to FSM 1005 that it will handle its own deactivation by execution of the STOP primitive. Once the state call is completed, and the state is transferred to the idle state, triple 803 is executed. Since the $DEACTIVATE variable is true, the "then" portion of the "if" statement is executed, resulting the PURGE primitive being executed which removes the PODS script from the logical signal tables as illustrated in FIGS. 6 and 7.

The data structures utilized by feature control process 1000 in identifying which triple is to be executed in response to a given signal are illustrated in FIGS. 11, 12, and 13. The latter figures illustrate a detailed implementation of the logical signal tables represented in FIGS. 6 and 7.

When the finite state machine, FSM 1005 illustrated in FIG. 10, receives a signal from one of the processes 1001 through 1004, FSM 1005 first utilizes the current state index stored in location 1101 and the state pointer stored in 1102 to determine a location in state table 1104 via path 1103. The value stored at a location in state table 1104 is a pointer that indirectly points to a location in FSMSignal table 1110 via path 1105, FSMSignalPTR location 1107, and path 1108. State table 1104 contains one indirect pointer for each of the possible customer units' states. Similarly, there is one FSMSignalPTR pointer in 1106 through 1107 and 1120 for each of the possible states. Each of the FSMSignal tables 1109 through 1110 and 1121 is associated with one of the possible states. Each entry in an FSMSignal table is associated with an event definition for a signal that can occur in the state associated with that table. For example, once FSM 1005 indexes to FSMSignal table 1110, FSM 1005 then utilizes the signal number that identifies the signal being processed to index to the correct location within the latter table. The location indexed to in FSMSignal table 1110 points indirectly to ProgramID table 1116 via path 1111, triple list 1113, and path 1114. Table lists such as 1113 are also referred to as FSMSignal locations. For each of the possible signals which any of the states represented by FSMSignal tables 1109 through 1110 and 1121 can respond, there exists for each signal an FSMSignal location 1112 through 1113.

ProgramID table 1116 is also illustrated in FIG. 12. A ProgramID table such as 1116 contains references to all of the triples that can respond to the signal that FSM 1005 is presently processing and contains references to all the triples contained in the corresponding logical table of FIGS. 6 and 7.

In order for FSM 1005 to fully process the signal, it is necessary to execute each triple associated with an entry in a table such as ProgramID table 1116 or until the STOP primitive is executed by one of the triples. In order to process all the triples represented by the entries in table 1116, FSM 1005 maintains a current index variable and starts to process these entries with the most recently activated triple. Each entry in table 1116 consists of an index into a script table, such as 1201, and an index into a triple table such as 1208. Script table 1201 is pointed to via path 1202 which is an index from the bottom of table 1201 pointed to by the SCRIPTS variable. The identified location in script table 1201 points to script list 1206 via path 1203.

Figure 14:
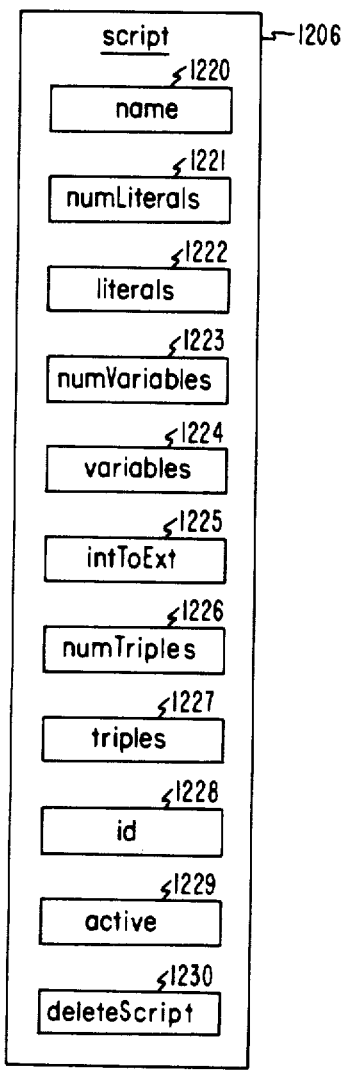
FIG. 14 illustrates block 1206 of FIG. 12 in greater detail.

Before starting to process the information identified in script list 1206, FSM 1005 stores the pointer identified in script table 1201 in the CURRENTSCRIPT variable. Script lists 1205 through 1207 contain all the information concerning the triples for a particular script that is common to the triples for that script. Within script list 1206, as illustrated in FIG. 14, the memory location designated as name 1220 contains the name of the script. The location designated as numLiterals 1221 contains the number of distinct literals that are used by all the triples in this script. The area designated as literals 1222 comprises two segments. The first segment is a table of pointers that are indexed by the literal ID field of a literal argument instruction which designates the actual literal string contained in the second segment of area 1222. This second segment comprises the literal strings. The area designated numVariables 1223 contains the number of distinct variables used by all the triples in the script. The area designated variables 1224 comprises the variable names as string variables that are indexed to by the ID field of a variable argument instruction. Variables 1224 is used during the initial downloading of the system. Area intToExt 1225 is a table of pointers that is indexed by the variable ID field of a variable argument instruction of triple and contains indexes to a global table of variable values. The area designated numTriples 1226 defines the total number of triples contained in triple array 1208 pointed to by variable 1227. Variable id 1228 is used to store the index used to index into script array 1201. The variable 1229 designates whether the script is currently active or not. Finally, the variable designated deleteScript 1230 is used when a script is to be totally removed from memory.

Triples 1227 in script list 1206 of FIG. 12 or FIG. 14 contains a pointer to triple table 1208. The latter table contains pointers which indirectly point to the compiled code for the triples of the script. Triple table 1208 is indexed into using the triple field from ProgramID table 1116 via path 1204. The location indexed by path 1204 into triple table 1208 points to triple 1210 that comprises a series of memory locations that, in turn, point to various pieces of information within the actual coded implementation of the triple. There is one coded implementation of a triple for each entry in triple table 1208 and a corresponding triple such as triples 1209 through 1211.

Once the compiled triple code pointed to by triple 1210 has been executed, interpreter 1006 illustrated in FIG. 10 once again returns control to FSM 1005. The latter indexes to the next location in ProgramID table 1116, indexes through a path similar to what was previously described, until the new code for the next triple is identified by one of the triples 1209 through 1211, and then, FSM 1005 once again passes control to interpreter 1006. This process continues until all of the triples in ProgramID table 1116 have been executed or until one of the triples executes a STOP primitive.

The compiled code format of a triple is illustrated in FIG. 15 and is encoded using numerical codes (ASCII). Location 1500 defines the number of bytes in the compiled code. The number of states specified in the state definition of the triple (i.e., the number of states to which the triple applies) is stored in location 1501 and the numerical IDs of these states are located in location 1503. Similarly, the ID of the named event is stored in location 1504. There is one compiled triple for each event specified in event definition of the sOurce code triple. The information stored in 1501 through 1504 is utilized during the activation of a script. The instruction portion or action of the compiled code is contained in locations 1505 and 1506. Area 1505 normally comprises two distinct portions. If there are no event parameters specified in the event definition, then there is just the second portion as described in the following material.

The first portion of area 1505 is utilized to recover values that are being passed into the compiled triple code by the signal occurrence and to make the determination whether or not the event definition of the triple has been fully satisfied and thus whether or not the subsequent portion should be executed. The second portion of area 1505 contains primitives and instructions. Location 1506 contains the HALT primitive which causes interpreter 1006 to return control to FSM 1005 if a STOP or CONTINUE has not been encountered previously in the execution of area 1505. The primitives are subroutine calls to C++ functions to perform the actions indicated.

Figure 17:
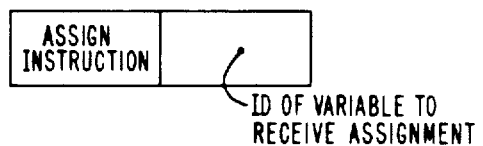
Figure 18:
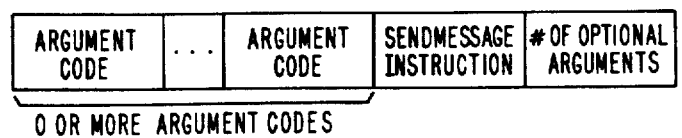

The general sequence of the codes in area 1505 consists of argument codes followed by instruction codes or a primitive call that use the preceding arguments. The exception to this normal flow of arguments and instructions and primitives is illustrated in FIGS. 17 and 18. FIG. 17 illustrates the assignment instruction where the instruction comes first followed by the internal identification code of the variable to receive the assignment. FIG. 18 illustrates the SENDMESSAGE instruction which can have an optional number of parameters to be transmitted indicated in the second field of the instruction.

Figure 19:
Figure 20:
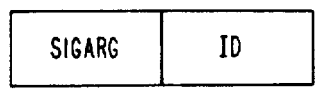

In general, the argument codes fall into the classes of literals, variables, branch-to-address arguments, or signal arguments. FIGS. 19 and 20 illustrate the format of these instructions for the literal or variable and the signal argument, respectively. When one of these arguments is encountered by interpreter 1006, it takes the following internal identification code, labeled as ID, obtains a pointer to the actual value using the ID as an index into a table, and pushes this pointer onto the interpreter stack. When the instruction or primitive using that argument is executed, it pops the stack to obtain the pointer and utilizes this pointer to pass the actual value.

Signals are tested and associated values are recovered in the following manner. The event parameters of a triple can transfer information into the compiled triple at the time the triple is executed. This information can consist of a retrieved value for a variable or can consist of a plurality of values, e.g., "input" event. FSM 1005 stores any values that must be passed into the event parameter code in the SIGNAL_ARG array. The first instructions of the compiled code for a triple retrieve these values. For an event definition such as "origin ($SOURCE)", the value recovery code simply accesses the first location of the SIGNAL_ARG array and obtains the value stored there and sets the $SOURCE variable equal to the retrieved value. In the case of an event such as "input", it is necessary to recover the first input string that was received from the terminal and then to compare this string against the data stored from the compiled triple in a literal table to determine whether or not the input event is exactly matched as it is defined in the triple. If the input event literal information does not match that which has been stored from the compiled triple, then control is returned to FSM 1005 for execution of the next triple. If the first input string that was received from the terminal matches the first argument of the input event definition, then the remainder of the code of the triple is executed. The rcvmessage, reply, and time events function in a similar manner to that of the input event. In addition, the input, rcvmessage, and reply events also can have a variable number of variable arguments whose values must be obtained from the SIGNAL_ARG array by positional correspondence at the time the triple is executed and stored in the proper variable locations. After the values have been recovered, the remainder of the triple code is executed.

Figure 21:
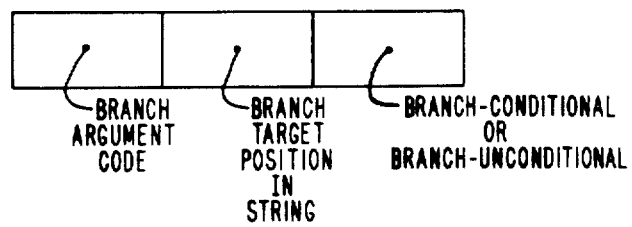

The format of a branch instruction is illustrated in FIG. 21. In the case of a conditional branch, the interpreter pops from the stack the test value which determines a branch or no branch. Tables I, II, and III give the decimal numerical codes for the event, state, and instruction codes, respectively.

TABLE I

| Event | Code |
|---|---|
| origin | 0 |
| disconnect | 1 |
| off-hook | 2 |
| on-hook | 3 |
| digits | 4 |
| ringing | 5 |
| answer | 6 |
| busy | 7 |
| query | 8 |
| idle | 9 |
| notidle | 10 |
| rcvmessage | 11 |
| input | 12 |
| reply | 13 |
| alarm | 14 |
| time | 15 |
| activate | 16 |
| deactivate | 17 |
| enter | 18 |
| leave | 19 |

TABLE II

| State | Code |
|---|---|
| idle | 0 |
| ringing | 1 |
| talking | 2 |
| disconnect | 3 |
| dialing | 4 |
| busy | 5 |
| audible | 6 |
| outpulsing | 7 |

TABLE III

| Instruction | Code | Primitives | Mnemonic | Code |
|---|---|---|---|---|
| HLT | 0 | ALARM | ALM | 21 |
| BRU | 1 | CANCEL | CAN | 22 |
| BRC | 2 | APPLY | APP | 23 |
| LAR | 3 | REMOVE | RMV | 24 |
| VAR | 4 | SEND | SND | 25 |
| SAR | 5 | SENDMESSAGE | SNM | 26 |
| BAR | 6 | PRINT | PRI | 27 |
| EQL | 7 | DIAL | DIA | 28 |
| NEQ | 8 | FORWARD | FWD | 29 |
| GRT | 9 | ASK | ASK | 30 |
| LSS | 10 | ACTIVATE | ACT | 31 |
| GEQ | 11 | DEACTIVATE | DEA | 32 |
| LEQ | 12 | ASSIGN | ASN | 33 |
| ADD | 13 | ENGAGE | ENG | 34 |
| SUB | 14 | DISENGAGE | DIS | 35 |
| MUL | 15 | NEXTSTATE | NXT | 36 |
| DIV | 16 | PURGE | PRG | 37 |
| NEG | 17 | CONTINUE | CON | 38 |
| AND | 18 | STOP | STP | 39 |
| ORR | 19 | | | |
| NOT | 20 | | | |

Figure 22:
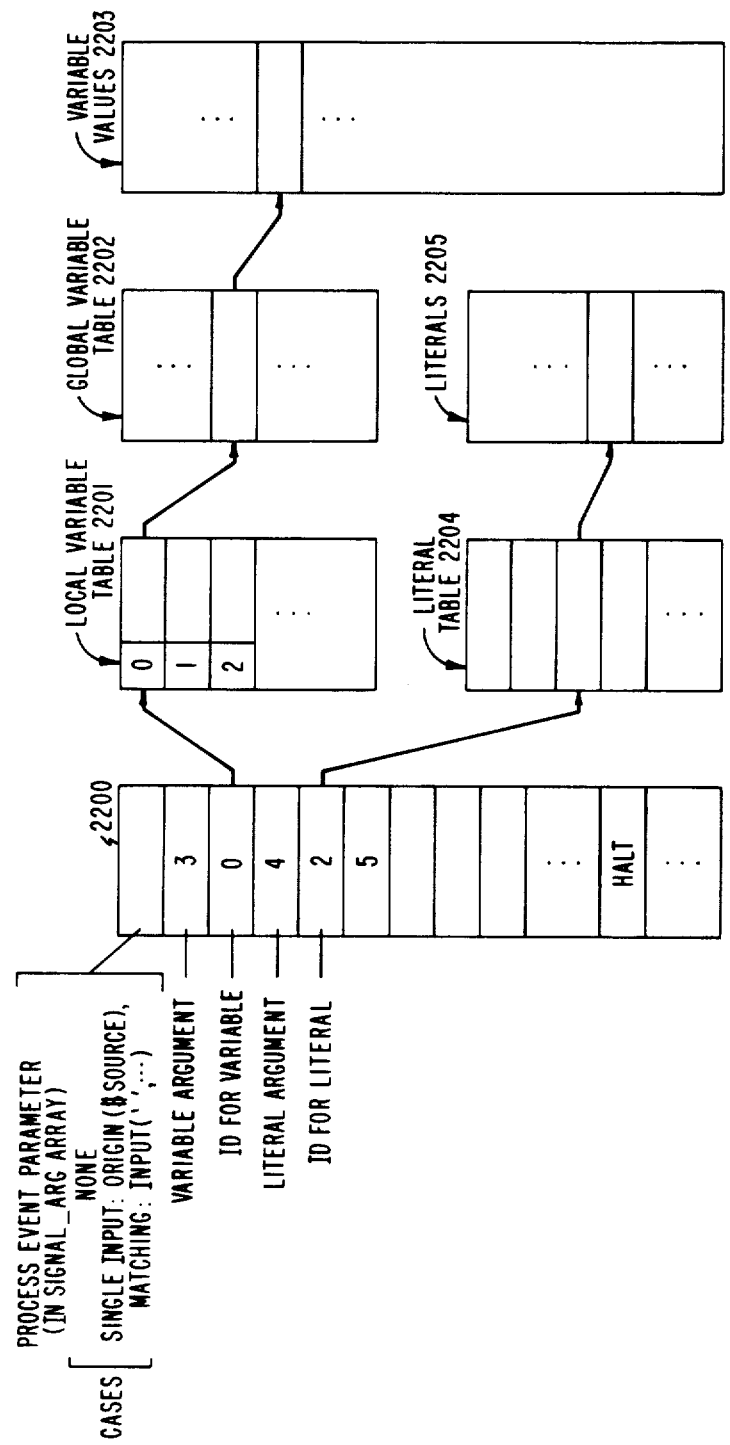
FIG. 22 illustrates in greater detail, the accessing of variable and literal values from their associated tables on the basis of information contained in a compiled triple such as the one illustrated in FIG. 15.

FIG. 22 illustrates the manner in which the literal and variable codes of a triple are utilized to gain access to the variable and literal information, respectively. The local variable table 2201, literal table 2204 also called literal 1225 in FIG. 14, and list of literals 2205 are maintained in the associated script list, such as script list 1206 of FIG. 14. List of literals 2205 is part of the compiled script. In the case of a variable, the variable code is utilized to access the local variable table 2201 also called intToExt table, such as 1225, in FIG. 14 from which an index is obtained into the global variable table 2202. The global variable table 2202 is common to all scripts within a given customer unit. From global variable table 2202, a pointer is obtained to the variable values 2203 which contains the actual character string value of the variable. Similarly, the literal code is utilized to access literal table 2204 (1222) from which a pointer is obtained to literal value 2205. All literals and variables in their associated lists are terminated with a null character to designate the end of each respective item of information.

During the downloading phase of the system operation, code within the prompt-user process 1003 is responsive to data being received from the computer 101 to be stored in the tables illustrated in FIGS. 11, 12 and 13.

Figure 23:
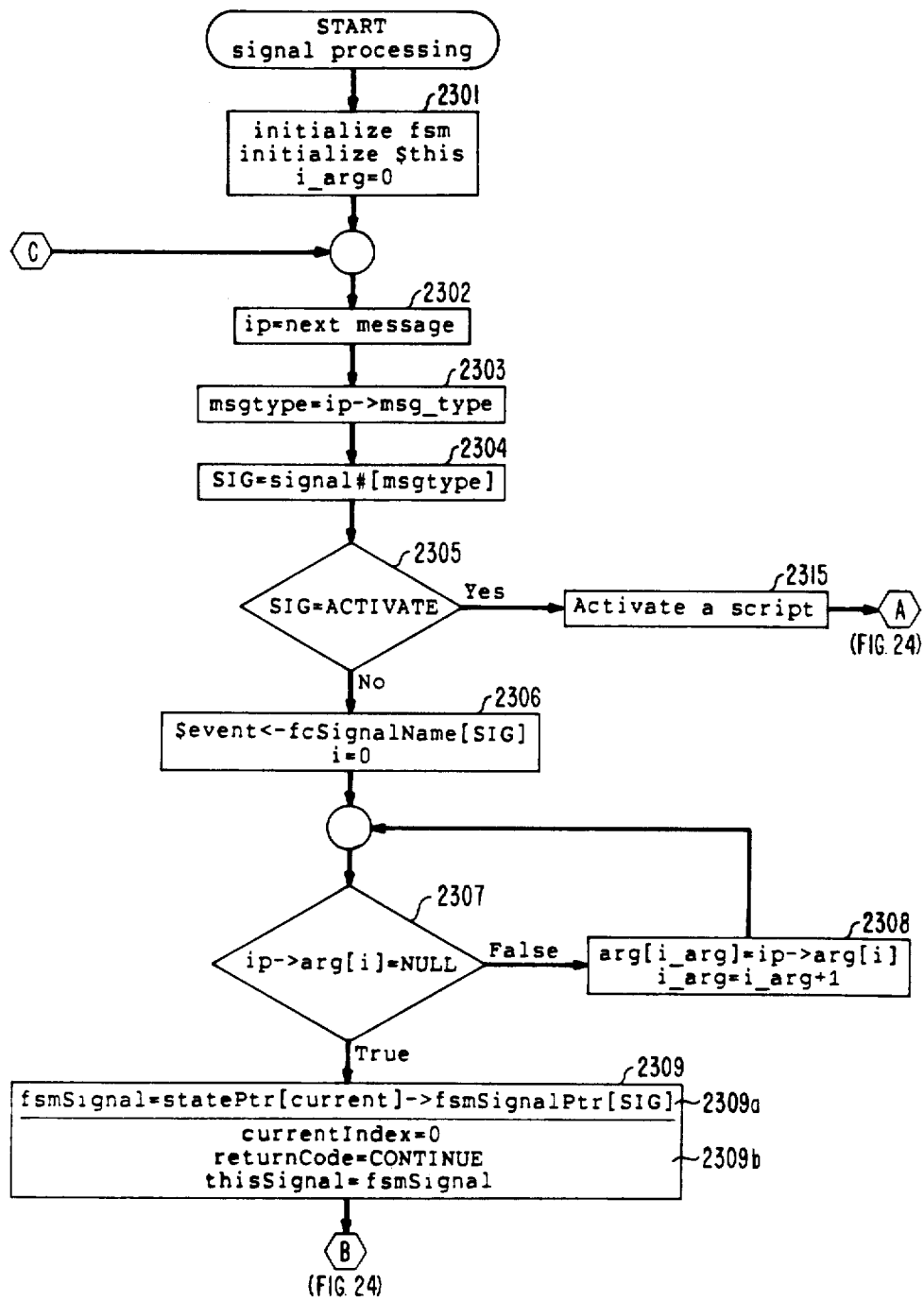
FIGS. 23 and 24 illustrate in flowchart form, FSM 1005 process of FIG. 10.
Figure 24:
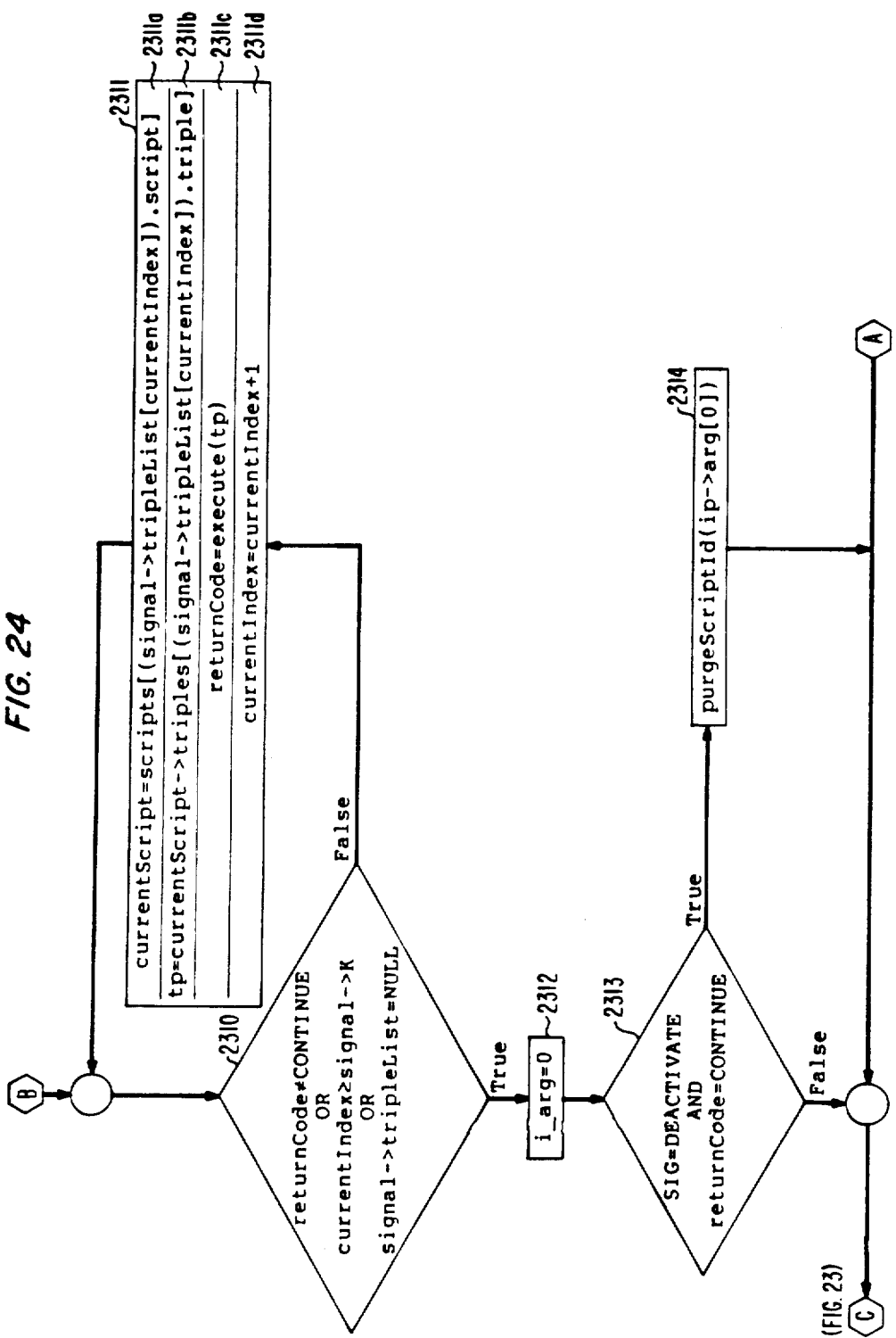

FIGS. 23 and 24 illustrate in flowchart form, a program for implementing FSM 1005. FIGS. 23 and 24 detail the logical flow of the program listed in Appendix F. The program listed in Appendix F is written in C++ which is described in detail in the book entitled, *The C++ Programming Language*, by B. Stroustrup. Once the program illustrated in FIGS. 23, and 24 has been initialized by block 2301, it repetitively executes blocks 2302 through 2315. Blocks 2313 and 2314 perform the deactivation of a script (i.e., the modification of tables and pointers in FIGS. 11, 12, and 13) when a deactivate signal is received, and block 2315 performs the activation of a script when an activate signal is received. Block 2301 first initializes certain variables internal to FSM 1005. The $THIS variable is set equal to the calling number of the customer unit and the i_arg variable is set equal to an index into a table of pointers that identify the parameters being passed with different operating system messages. The parameters comprise any string information associated with the signal.

When a message is received by FSM 1005, the ip pointer is set equal to the location of the next message to be processed from the operating system. As is well known in the art, the operating system can have a plurality of messages awaiting processing by FSM 1005 at any point in time and invokes the execution of FSM 1005 as long as there are messages to be processed. Block 2303 sets the MSGTYPE variable equal to the message type within the message by utilizing the ip pointer to point to the message type stored in the area designated by the operating system. Block 2304 utilizes the MSGTYPE index to index into the signal "#" table that contains numerical identification for each signal type. These decimal values are defined in Table IV. Once the numerical code for the signal has been determined in block 2304, decision block 2305 determines whether or not the signal is the activate signal or not. If the signal is the activate signal, then block 2315 is executed. The details of block 2315 are given with respect to FIGS. 29, 30, and 31.

TABLE IV

| Signal | Code |
|---|---|
| origin | 0 |
| disconnect | 1 |
| off-hook | 2 |
| on-hook | 3 |
| digits | 4 |
| ringing | 5 |
| answer | 6 |
| busy | 7 |
| query | 8 |
| idle | 9 |

TABLE IV-continued

| Signal | Code |
|---|---|
| notidle | 10 |
| rcvmessage | 11 |
| input | 12 |
| reply | 13 |
| alarm | 14 |
| time | 15 |
| activate | 16 |
| deactivate | 17 |
| enter | 18 |
| leave | 19 |

Block 2306 is utilized to access into the table FCSIGNALNAME with the SIG variable in order to identify the event corresponding to the present signal being processed and to store the name string for the event in the $EVENT variable. Blocks 2307 and 2308 access the parameters of the operating system message and store these parameters in an array called ARG.

Block 2309a implements the paths shown in FIGS. 11 and 12 to determine which FSMSIGNAL structure to utilize such as FSMSIGNAL 1113. The latter block implements the logical paths from variables 1101 and 1102 through state table 1104, an FSMSIGNALPTR variable, such as in 1107, and FSMSIGNAL table, such as 1110. Block 2309b sets the current index to zero. The current index is used to index into a ProgramID table such as 1116. In addition, block 2309b sets the return code equal to CONTINUE. During the interpretation of the compiled code, the code for a given triple may change the return code to a STOP. In addition, block 2309a sets the THISSIGNAL variable equal to the SIGNAL variable.

Once the entry in an FSMSIGNAL structure, such as 1113, has been accessed, this entry points to a ProgramID table via a triple list, such as in 1113. Blocks 2310 and 2311 then proceed to execute the compiled code for all of the triples identified in the designated ProgramID table. The designated ProgramID contains pointers which identify for the current state of the customer unit all of the triples that can respond to the signal presently being processed.

Block 2311a is utilized to identify a script structure such as 1206 of FIG. 12 via the script portion of an entry in the ProgramID table 1116 via a script table such as 1201. The entry in the script table identified as illustrated by path 1202 determines the script containing the triple presently being processed. The identified entry in the script table is stored in the CURRENTSCRIPT variable. Block 2311b then identifies the compiled triple code 1210 to be executed via illustratively the path shown on FIGS. 12 and 13 of path 1212, path 1204, triple table 1208, and path 1215. The variable TP is set equal to the identified triple such as 1210. Block 2311c then causes the execution of the function "EXECUTE" which actuates interpreter 1006 illustrated in greater detail in FIGS. 34, 35, 36, and 37. Block 2311c passes to the interpreter the TP variable which points via the triple 1210 to the compiled triple code to be executed. The interpreter returns the value of the returned code which is either a STOP or CONTINUE. Block 2311d then increments the current index so that compiled code for the next triple in the designated ProgramID table 1116 can be executed.

After block 2311 has been executed, decision block 2310 passes control to block 2312 if any of the following conditions are true. First, is the return code equal to STOP. If the return code is equal to a CONTINUE, then block 2311 is reexecuted. However, if the return code is equal to a STOP, then the processing of the current signal ceases and block 2312 is executed. The second condition that is checked is whether the current index is greater than the number of entries in the designated ProgramID table 1116. The final condition checked is whether or not the triple just interpreted by block 2311c had executed the PURGESCRIPTED routine. Execution of the latter routine would not only have removed the executing triple from the ProgramID table, but possibly other unexecuted triples in the same script. In addition, this final condition is met if initially there are no triples that can respond to the current signal in the current state. If the removal of the unexecuted triples resulted in no other triples left in the designated ProgramID table, then the ProgramID table 1116 is removed and the triple list pointer of 1113 is set to NULL. If any of the three previous conditions are met, block 2312 is then executed setting the initial conditions for indexing into the ARG table to the correct value for subsequent execution by block 2308.

Blocks 2313 and 2314 detail the handling of a deactivate signal. The deactivate signal can have a corresponding deactivate event within the script to be deactivated, and a script, by utilizing a deactivate event, can postpone the physical deactivation or purging of the script to a later point in time. This capability is given to scripts whose work cannot be arbitrarily terminated but must go to completion. Such a script is illustrated in FIGS. 8 and 9. A script defers its deactivation to a later point in time by executing a STOP primitive within the script's triple that responds to the deactivate signal. Decision block 2313 detects execution of the STOP primitive and does not execute block 2314 which performs the purging of the script. Block 2314 performs the purging of a script by removing references to all triples contained within the script in all ProgramID tables.

Figure 25:
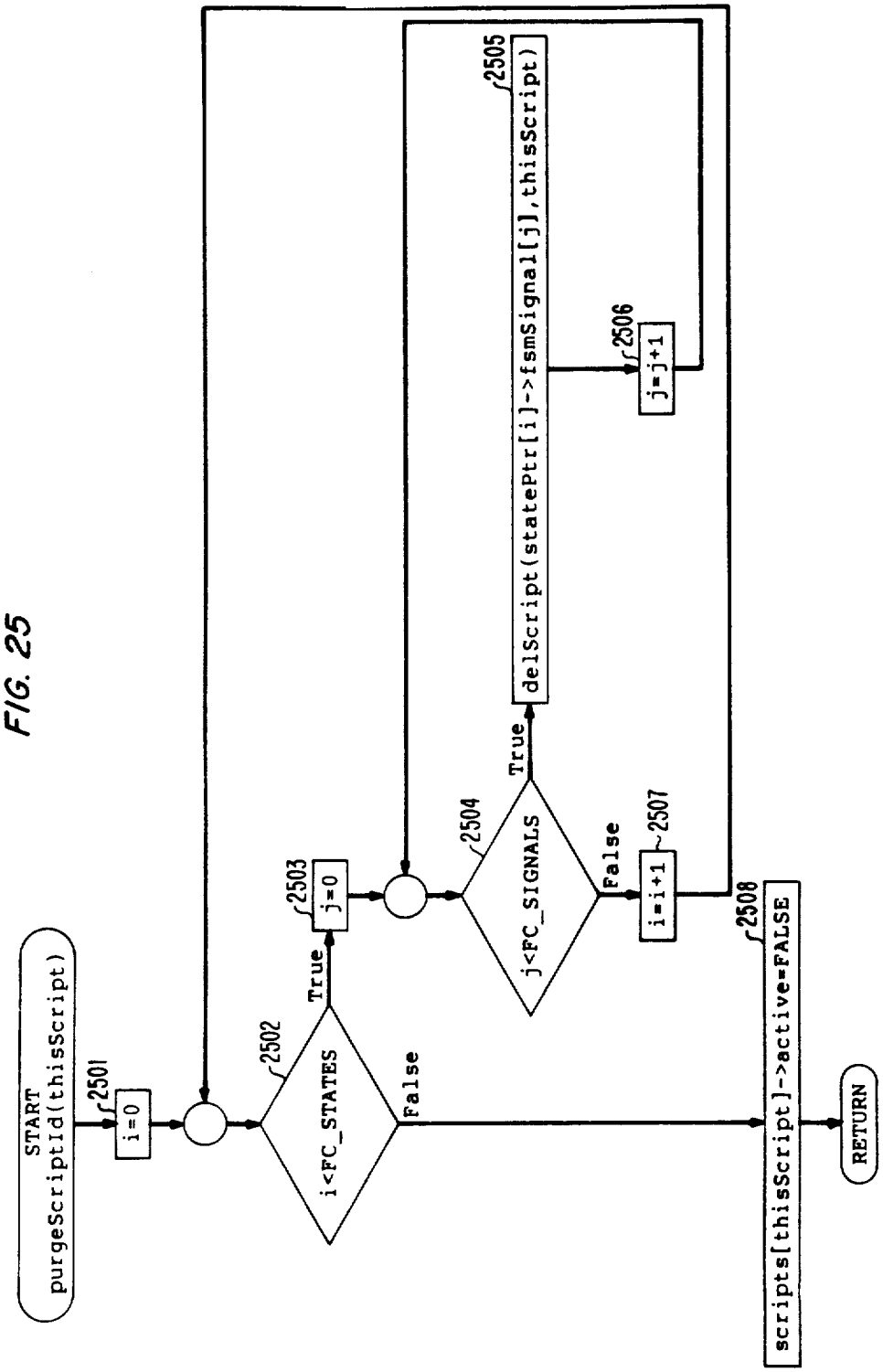
FIG. 25 illustrates in flowchart form, block 2314 of FIG. 24.

Block 2314 of FIG. 24 is shown in greater detail in FIG. 25. The PURGESCRIPTED procedure functions by cycling through each state and each signal within that state to remove all of the triples associated with the script being deleted from the ProgramID table corresponding to that signal for that state. It utilizes the DELSCRIPT function referenced in block 2505 to remove these triples. The variables i and j are used to index into the states and signals, respectively. Initially, i is set equal to zero by block 2501. All of the states are then checked to see if there are any triples associated with the script being deleted as designated by the contents of the THISSCRIPT argument or parameter. Decision block 2502 determines when all states have been checked by comparing i to the total number of states as contained in the variable FC_STATES. As long as i is less than the total number of states, blocks 2503 through 2507 are executed. For each iteration through blocks 2503 through 2507, block 2503 sets the j variable equal to zero. Decision block 2504 controls the execution of the DELSCRIPT function until all the signals have been deleted.

The DELSCRIPT function is passed a pointer identifying the ProgramID table from which it is to delete all triples associated with the script being deactivated. Then DELSCRIPT function then cycles through all of the entries of the designated ProgramID array eliminating the triples associated with the script being deactivated. The i variable is stepping through the state table 1104 of FIG. 11. For each entry in table 1104, an FSM signal table, such as 1110 is identified. The j variable then steps through each entry in the identified FSM signal table with each entry identifying a ProgramID table via a triple list/FSM signal variable such as 1113.

Figure 26:
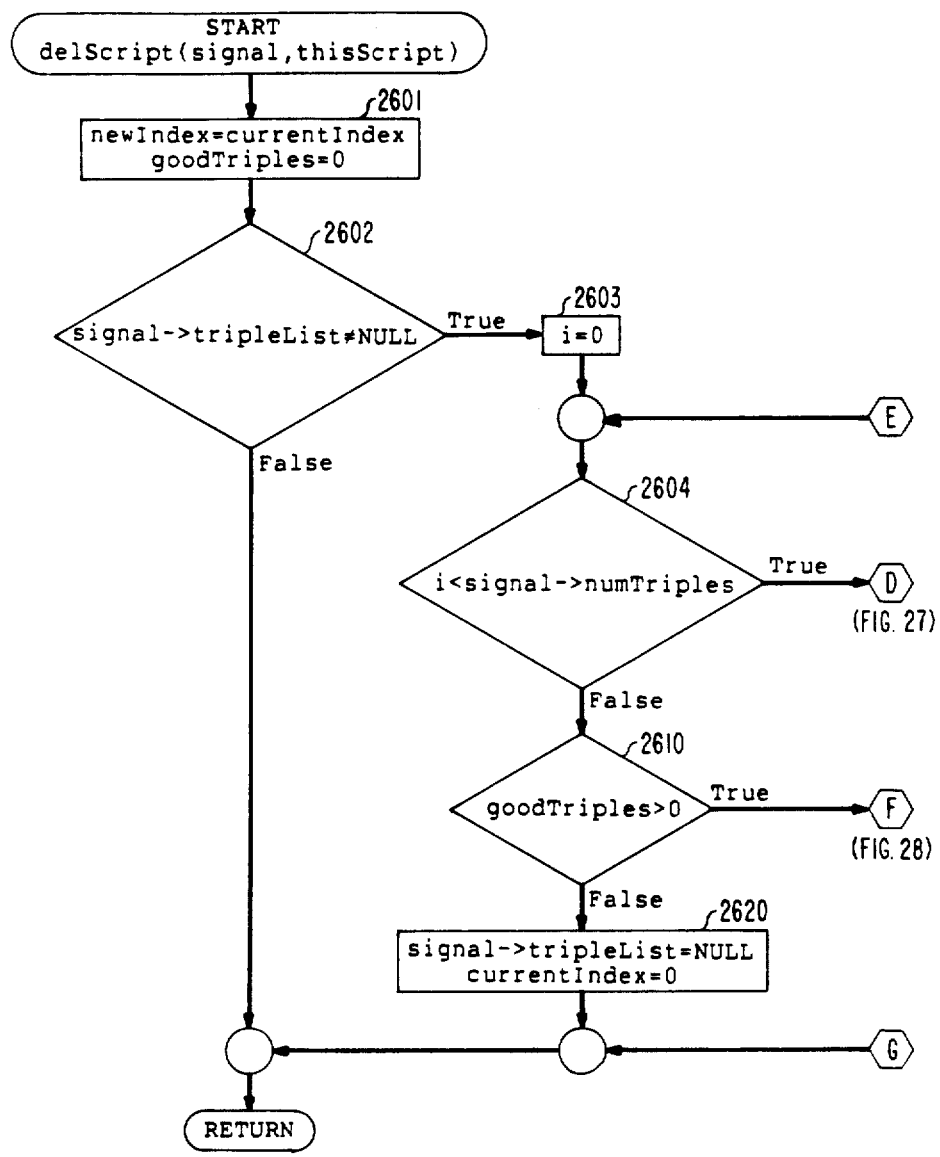
FIGS. 26, 27, and 28 illustrate in greater detail, block 2505 of FIG. 25.
Figure 27:
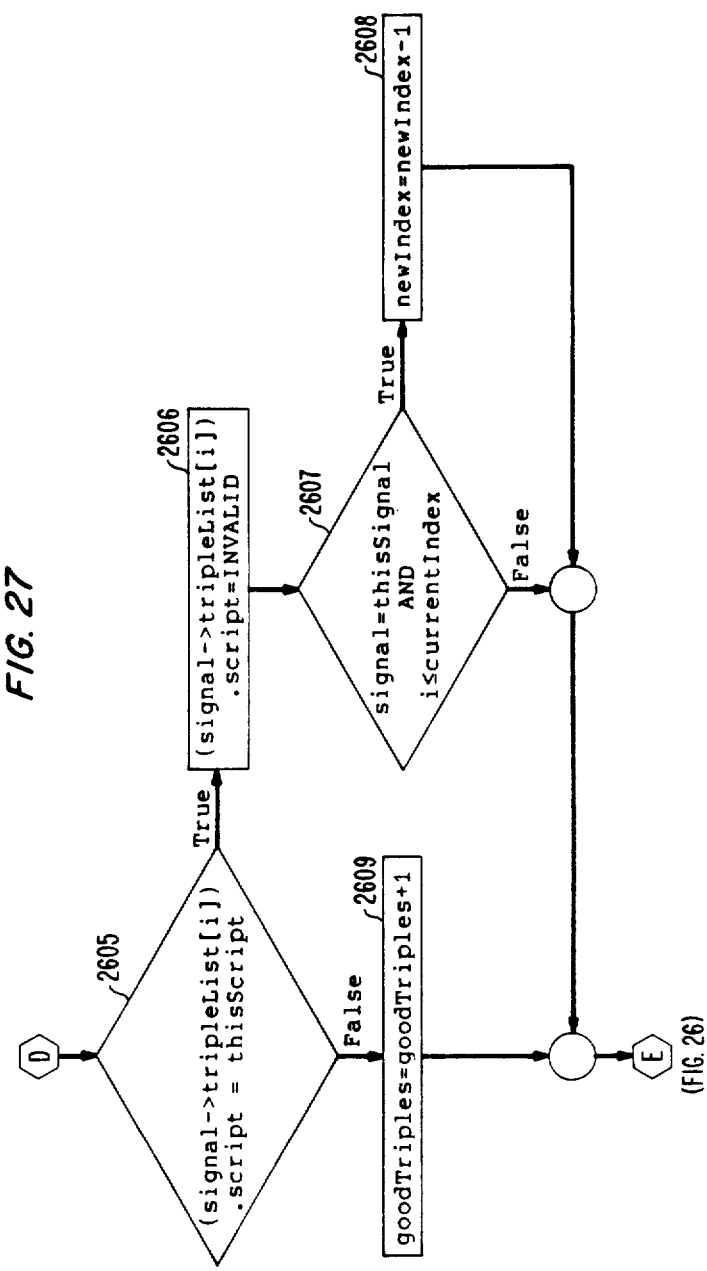
Figure 28:
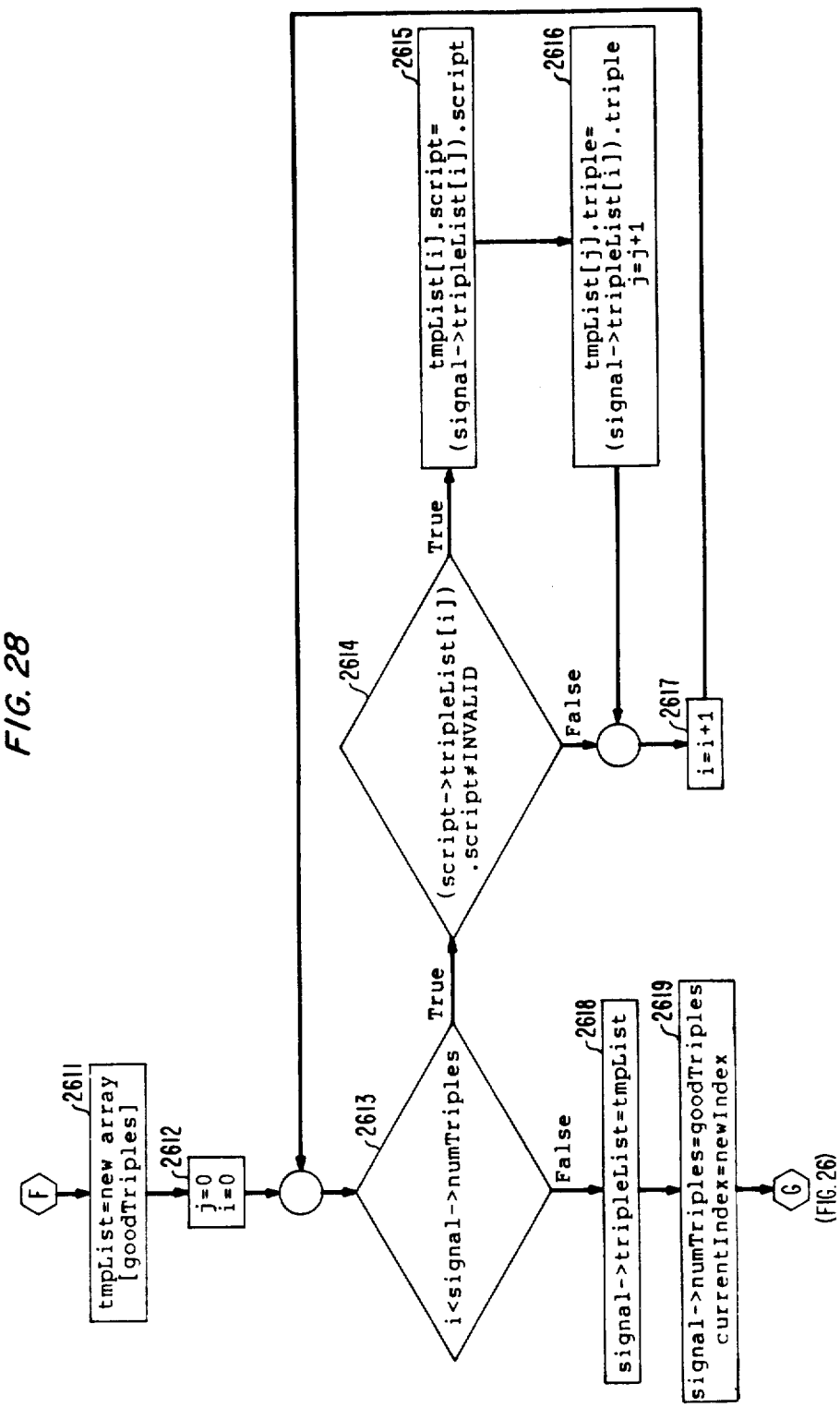

The DELSCRIPT function of block 2505 of FIG. 25 is illustrated in greater detail in flowchart form in FIGS. 26, 27, and 28. The triples associated with a script are deleted in two stages. The first stage is for blocks 2604 through 2609 to determine the new number of triples identified in the ProgramID array 1116 which is stored in GOODTRIPLES and the new value for the current index variable which is stored in NEWINDEX. The actual removal of the triples associated with the present script and signal is performed by blocks 2611 through 2619. The procedure is to create a temporary ProgramID table, transfer all of the triples to be saved from the old table and then make the temporary table the new ProgramID and identify it in a TRIPLELIST variable, such as in 1113.

Upon execution of block 2601, the NEWINDEX variable is set equal to the CURRENTINDEX variable. The CURRENTINDEX variable is equal to the index of the triple presently being processed in blocks 2310 through 2311 of FIG. 24. The variable GOODTRIPLES is initialized to zero. Since blocks 2503 through 2507 of FIG. 25 assume that every signal has a corresponding ProgramID table in each state, it is necessary to verify whether or not the particular signal being processed, indeed, does have a corresponding ProgramID table for a particular state. This determination is performed by decision block 2602. As illustrated in FIG. 11, an FSMSIGNAL table has pointers to a series of triple lists 1112 through 1113. There is one entry for every possible signal in each FSMSIGNAL table and there is a corresponding FSMSIGNAL structure/triple list for each entry. If there is not a triple responsive to a particular signal for a given state, the triple list for that signal contains a null value. If the triple list identified by a particular entry in the present FSMSIGNAL table that the PURGESCRIPTID function is processing contains a null value, then decision block 2602 returns control to the PURGESCRIPT function. If the triple list does not contain a null value, this means that the signal has a set of corresponding triples in this state and control is transferred to block 2603.

Consider now, the details of how the determination is made of the number of valid triples that is stored in variable GOODTRIPLES. Decision block 2604 determines whether or not the number of triples identified in the present ProgramID is greater than the maximum number. The maximum number of triples in a ProgramID is stored in location k such as in 1116, as illustrated in FIG. 12. If i is less than the maximum number of triples, then decision block 2605 is executed to determine whether the entry in the ProgramID block is related to the script that is being deleted. If the script index is different than the script presently being processed, which is identified by an entry in the THISSCRIPT variable, block 2609 is executed which increments the GOODTRIPLES variable by one. If the script for the triple entry presently being pointed to by i matches the THISSCRIPT variable, then block 2606 is executed which marks the entry in the ProgramID table pointed to by the i variable as invalid for later processing by blocks 2611 through 2619.

Control is then passed to decision block 2607. The latter decision block determines whether or not the triple that is to be removed is referenced lower in the ProgramID table then the current triple which is being executed and which had actually activated the DELSCRIPT function. If the ProgramID table presently being processed is that of the triple that caused the DELSCRIPT function to be executed and i is less than the current index which points to the triple being executed, then block 2608 is executed which causes the NEWINDEX variable to be decremented by one. This is done since the NEWINDEX variable was set equal to the CURRENTINDEX variable in block 2601. The contents of the NEWINDEX variable are used in block 2619 to adjust the CURRENTINDEX variable so that execution can continue from the ProgramID table after the present triple has finished being interpreted.

Once all the entries in the ProgramID table have been checked for triples that are to be retained, decision block 2610 is executed to determine if there are any triples left or if all triples in the ProgramID array were associated with the script that is being purged. If the latter condition is true, block 2620 is executed and the triple list is set equal to null value indicating that, for this particular state, there are no triples responsive to this particular signal. Then, the CURRENTINDEX is set equal to zero also so that no attempt is made later to execute another triple from this ProgramID table when control is returned to the FSM 1005.

If there are triples that were not associated with the script being purged, then blocks 2611 through 2619 of FIG. 28 are executed. Block 2611 sets a pointer TMPLIST equal to a new table having its number of entries equal to the number contained in the GOODTRIPLES variable. Blocks 2613 through 2617 then index through the ProgramID table looking for the entries that are not marked invalid. Any entry that is not marked invalid is transferred to the new array table by blocks 2615 and 2616 which insert the script and triple identifications, respectively. After all of the entries in the ProgramID have been checked, control is transferred to 2618 which sets the triple list pointer from the FSMSIGNAL table equal to the TMPLIST variable. This has the effect of making the new array table into the ProgramID table that is pointed to by the designated FSMSIGNAL table, such as 1113. Block 2619 then sets the number of triples as stored in the ProgramID table in the k location equal to the number contained in the GOODTRIPLES variable. And sets the CURRENTINDEX equal to the NEWINDEX variable.

Figure 29:
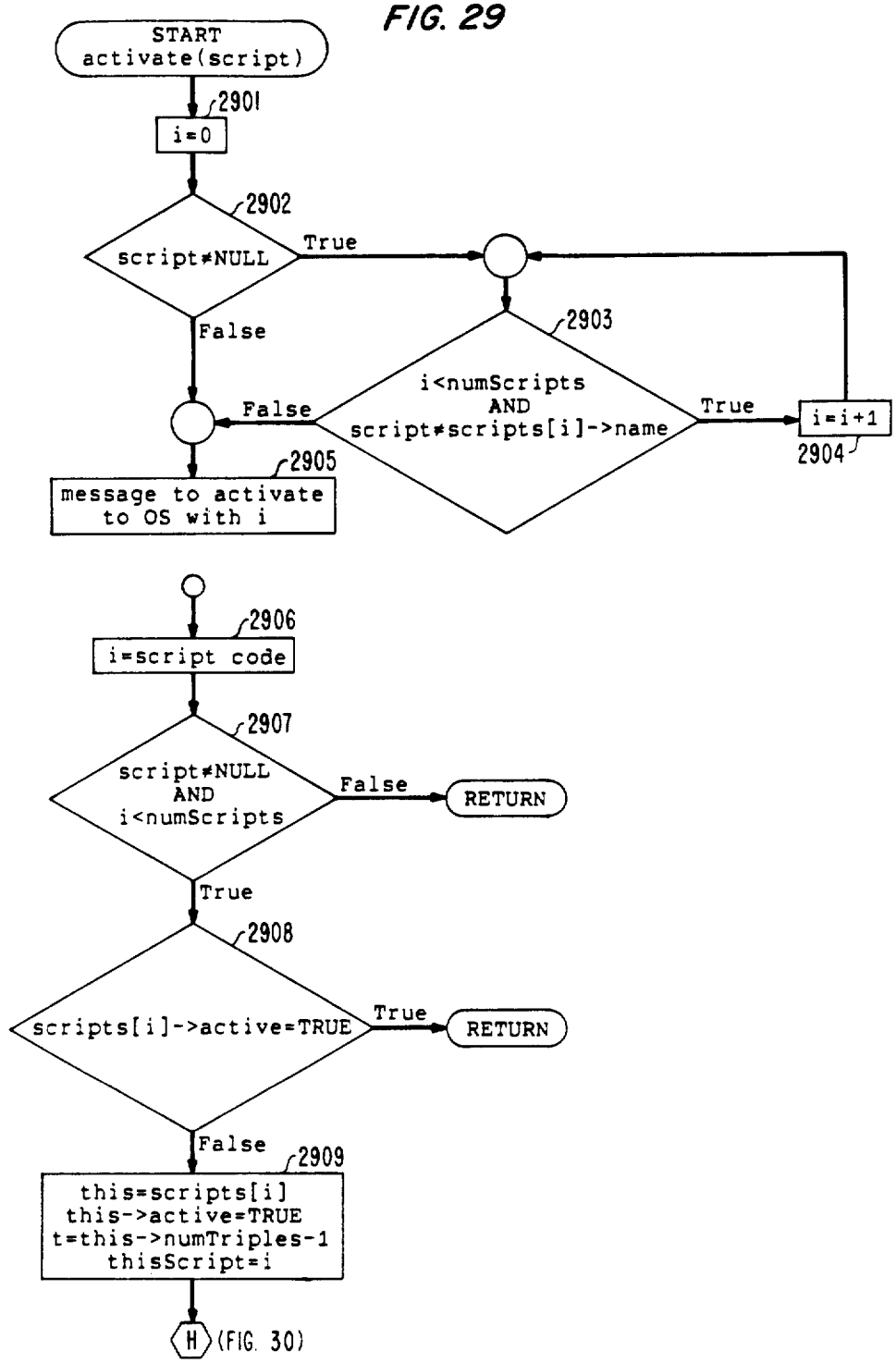
FIGS 29, 30, and 31 illustrate in greater detail, the activation of a program script by giving additional details of block 2315 of FIG. 23.
Figure 30:
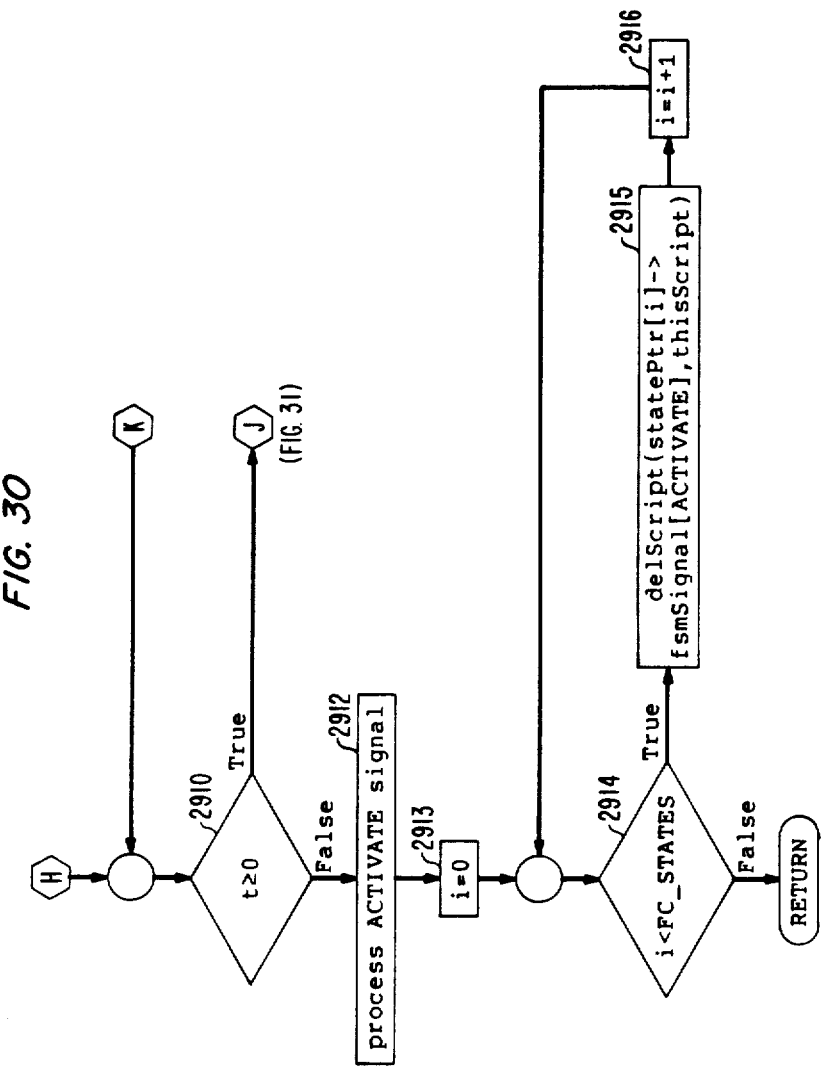
Figure 31:
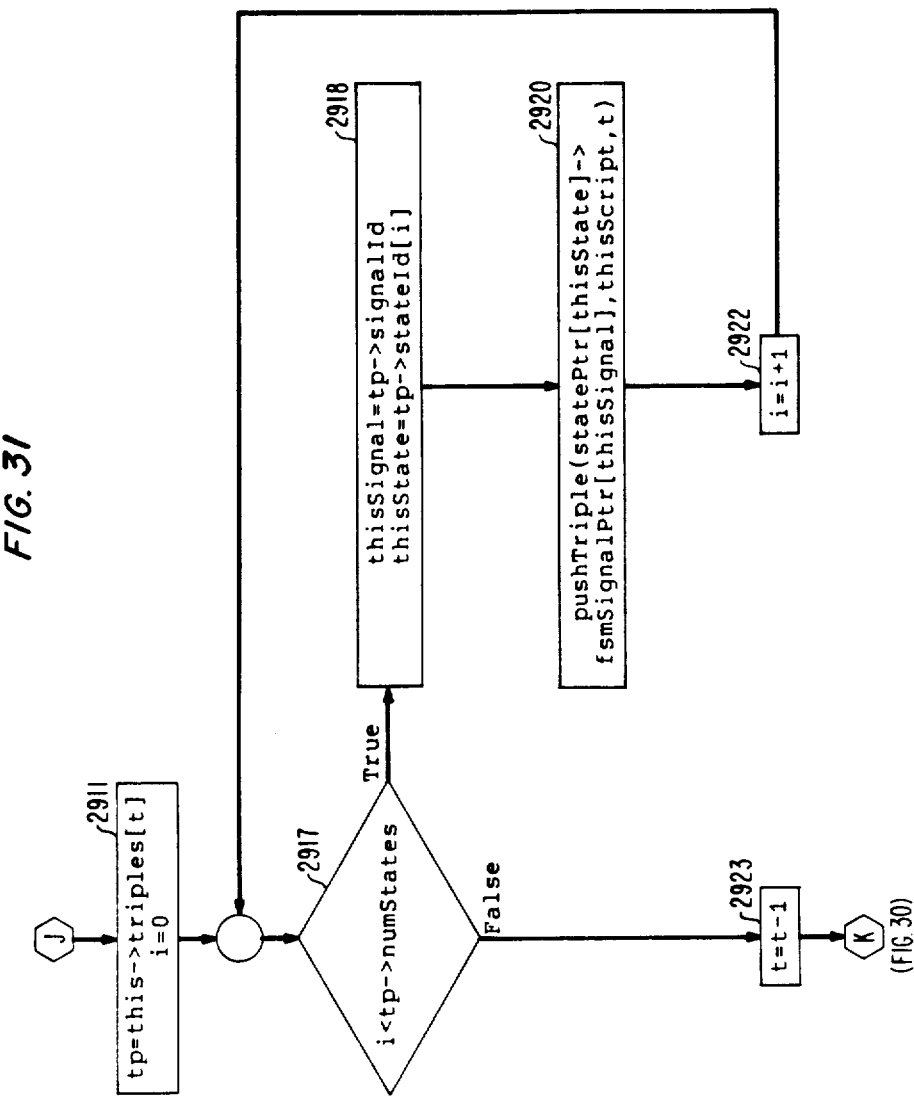

The operations performed by FSM 1005 in response to an activate signal as defined by block 2315 of FIG. 23 is illustrated in greater detail blocks 2906 through 2911 and blocks 2917 through 2923 of FIGS. 29, 30, and 31. Blocks 2901 through 2905 illustrate the details of the ACTIVATE primitive. The purpose of blocks 2901 through 2905 is to determine the numerical code for the script that is to be activated and then to send an operating system message containing this numerical code as a parameter to process control 1000. When process control 1000 receives this message, it invokes FSM 1005.

After FSM 1005 has been invoked and determines that the signal is the activate signal, control is transferred from decision block 2305 to block 2906. The latter block initializes i to the script code by obtaining the latter from the list of parameters in the message passed by the operating system. Decision block 2907 determines that the script code is valid; and, if it is, turns over control to decision block 2908. The latter decision blocks determine whether the present script has already been marked as active in the script structure or location such as 1206 by first obtaining a pointer from script table 1201 through utilizing the variable i as an index into the latter table. Block 2908 then checks the value of the ACTIVE variable 1229 of 1206. If the present script is marked inactive, then block 2909 is executed.

The purpose of the code 2909 through 2911 and blocks 2917 through 2923 is to insert into the ProgramID tables references to the triples of the script being activated. These references are only inserted into ProgramID tables that correspond to the state and the signal as designated in the state definition and event definition of each triple of the script being activated. As can be seen in FIG. 12, the address of the script table 1201 is known and the relationship of the scripts by numerical code can be used to index into table 1201. The information in the latter table is utilized in order to identify the triples of a script by processing, as an example, along path 1203, script 1206, paths 1212 and 1204, triple table 1208, path 1215, and triple 1210. Once the triple is identified, then the code shown in block 2918 can utilize the coded state and signal information within the compiled triple code itself to determine what ProgramID tables must receive a reference to the triple.

In block 2909, the THIS pointer is set equal to the contents of the script table 1201 indexed by the variable i and is then used to point into the variables for the script 1206. The THIS pointer is also used to set the ACTIVE variable, such as 1229, to TRUE. The variable t is set equal to one less than the number contained in the NUMTRIPLES variable stored in the script list. The THISSCRIPT variable is set equal to the contents of the variable i. The reason for setting t in this manner is that the first triple of a script has to have the highest priority, hence, it has to be the last triple pushed onto any particular ProgramID table.

Pointer TP points to a triple, such as 1210. As illustrated in FIG. 13, the triple contains pointers that identify the number of states and the signal that the triple associated with the triple list has in its state and event definitions. This information is used by decision blocks 2917 and 2919 and in block 2918, to determine how many states are present in the compiled code. The program illustrated in blocks 2917 through 2923 takes the compiled code for each triple and inserts references to that code by the utilization of the PUSHTRIPLE function of block 2920 into the ProgramID tables indicated by the coded states and the signal of the compiled triple itself. The variable i is used to index into the states identified in triple's state definition. Further details of this process are given with respect to FIGS. 32 and 33 which illustrates the PUSHTRIPLE function.

After all of the states have been processed for a given compiled triple, block 2923 is executed and t is decremented by one, and execution is passed to blocks 2910 and 2911. This process results in the triple table, such as 1208, being sequentially indexed through and the compiled triples indirectly pointed to by the locations of the triple table being properly identified in the required ProgramID tables. Once all of the entries in the triple table have been processed, decision block 2910 passes control to block 2912. Block 2912 executes code similar to that illustrated by blocks 2306 through 2314 of FIGS. 23 and 24. This allows the activate signal to be processed by any triples of the recently activated script which contain the activate event.

After the activate signal has been processed, i is reinitialized to zero and blocks 2914 through 2916 remove all references to triples whose event is "activate" for this particular script from the ProgramID tables by utilization of the DELSCRIPT function that was described with respect to FIGS. 26, 27, and 28. The purpose for eliminating all triples whose event is activate for the present script is so that a later activate signal will not cause these triples to perform any action since the activate event should only occur once for each script.

Figure 32:
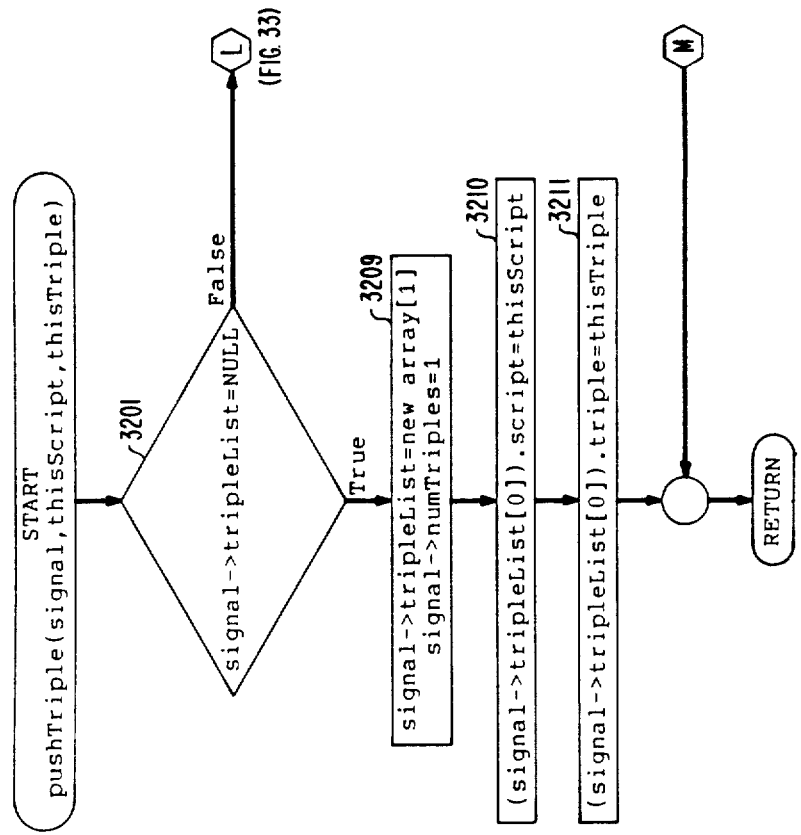
FIGS. 32 and 33 illustrate in greater detail, block 2920 of FIG. 31.
Figure 33:
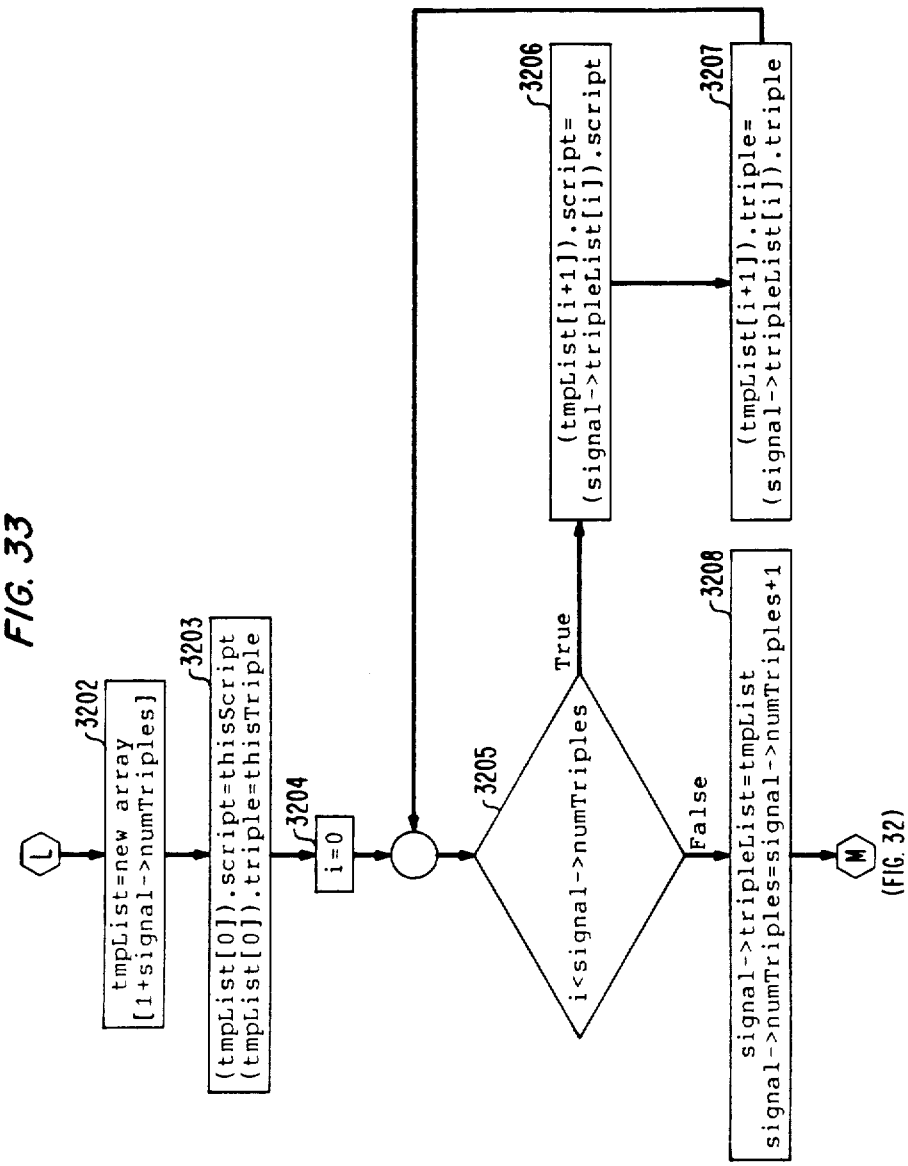
Figure 34:
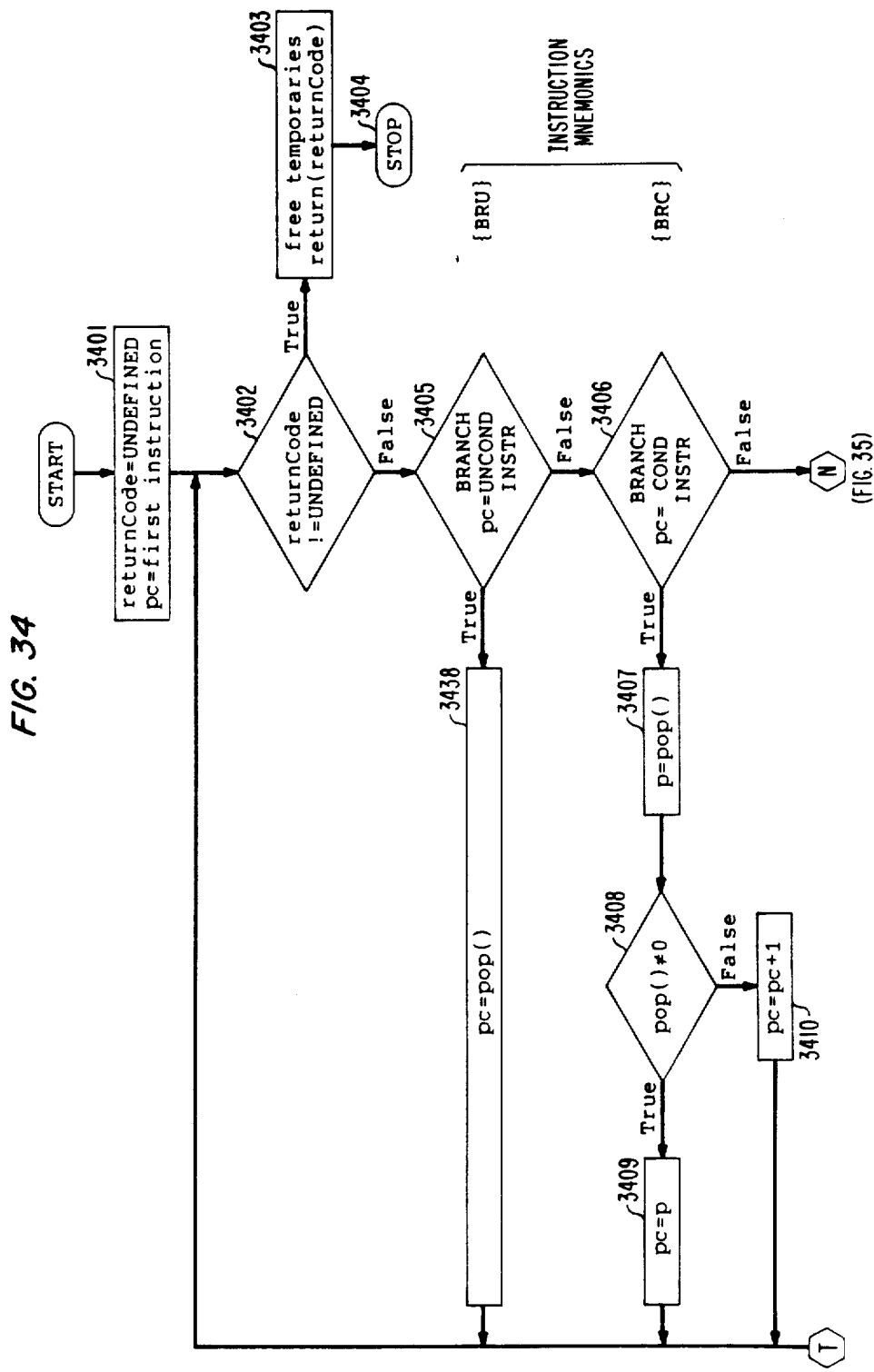
FIGS. 34 through 37 illustrate in flowchart form, interpreter 1006 of FIG. 10.
Figure 35:
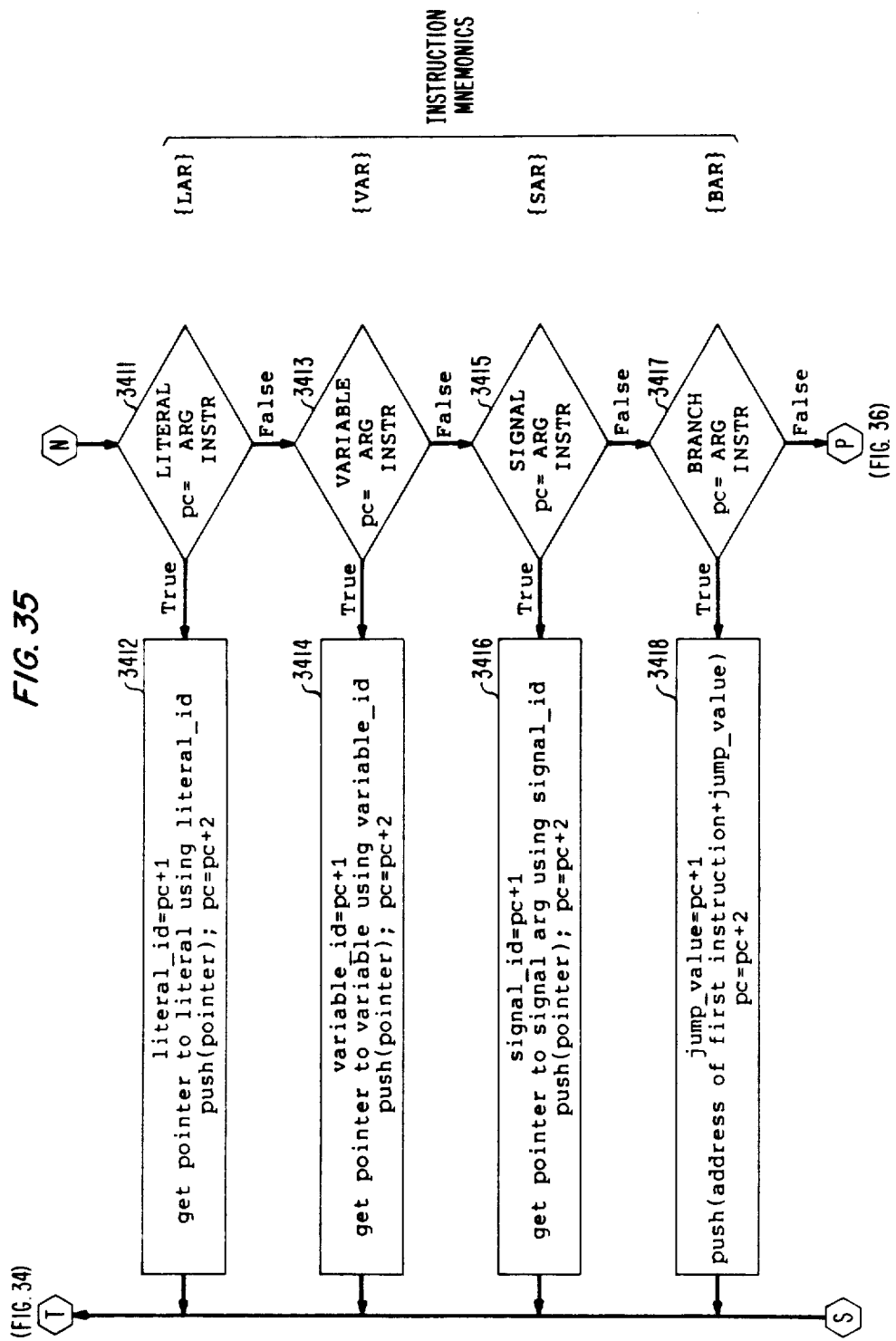
Figure 36:
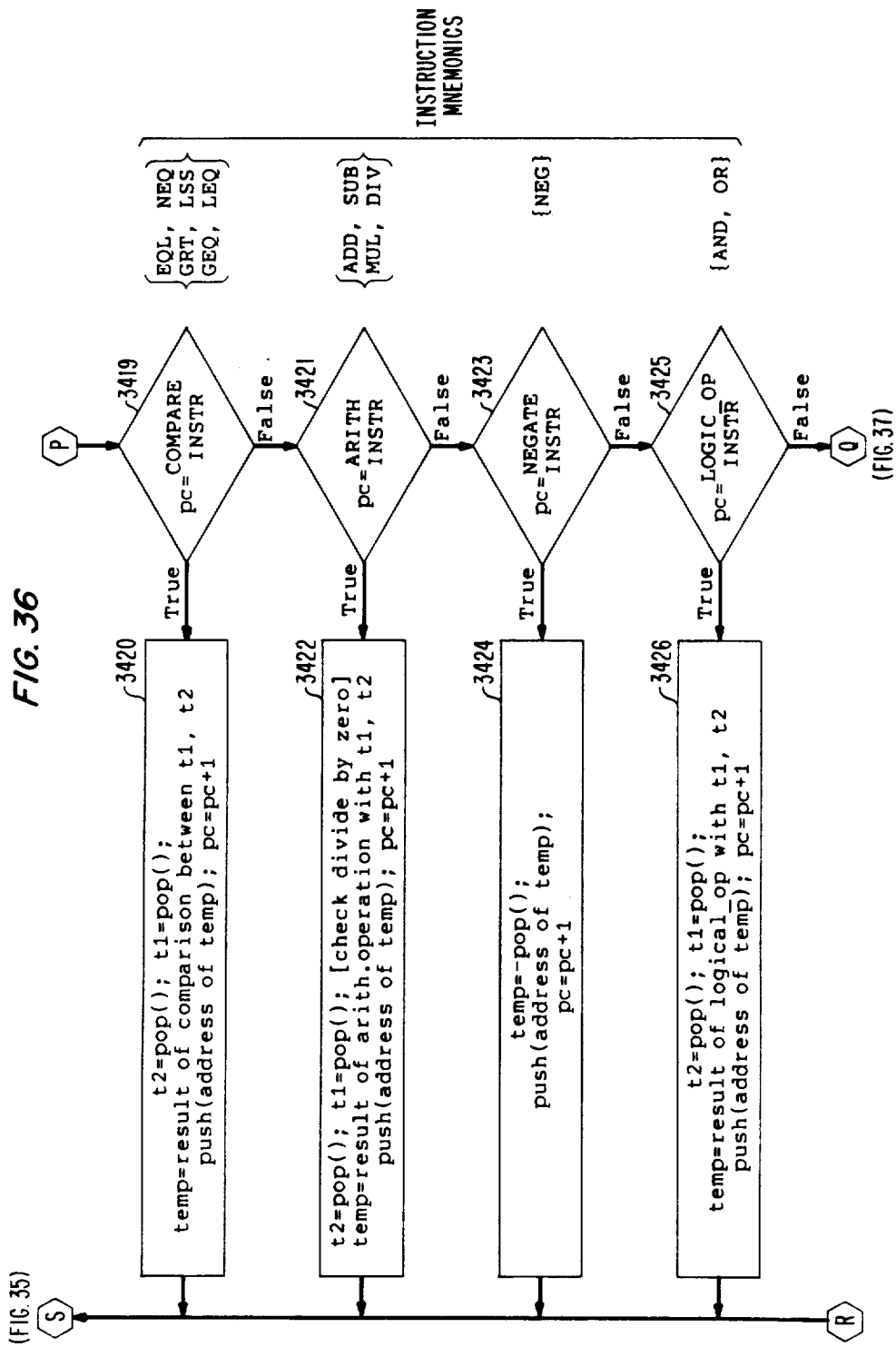
Figure 37:
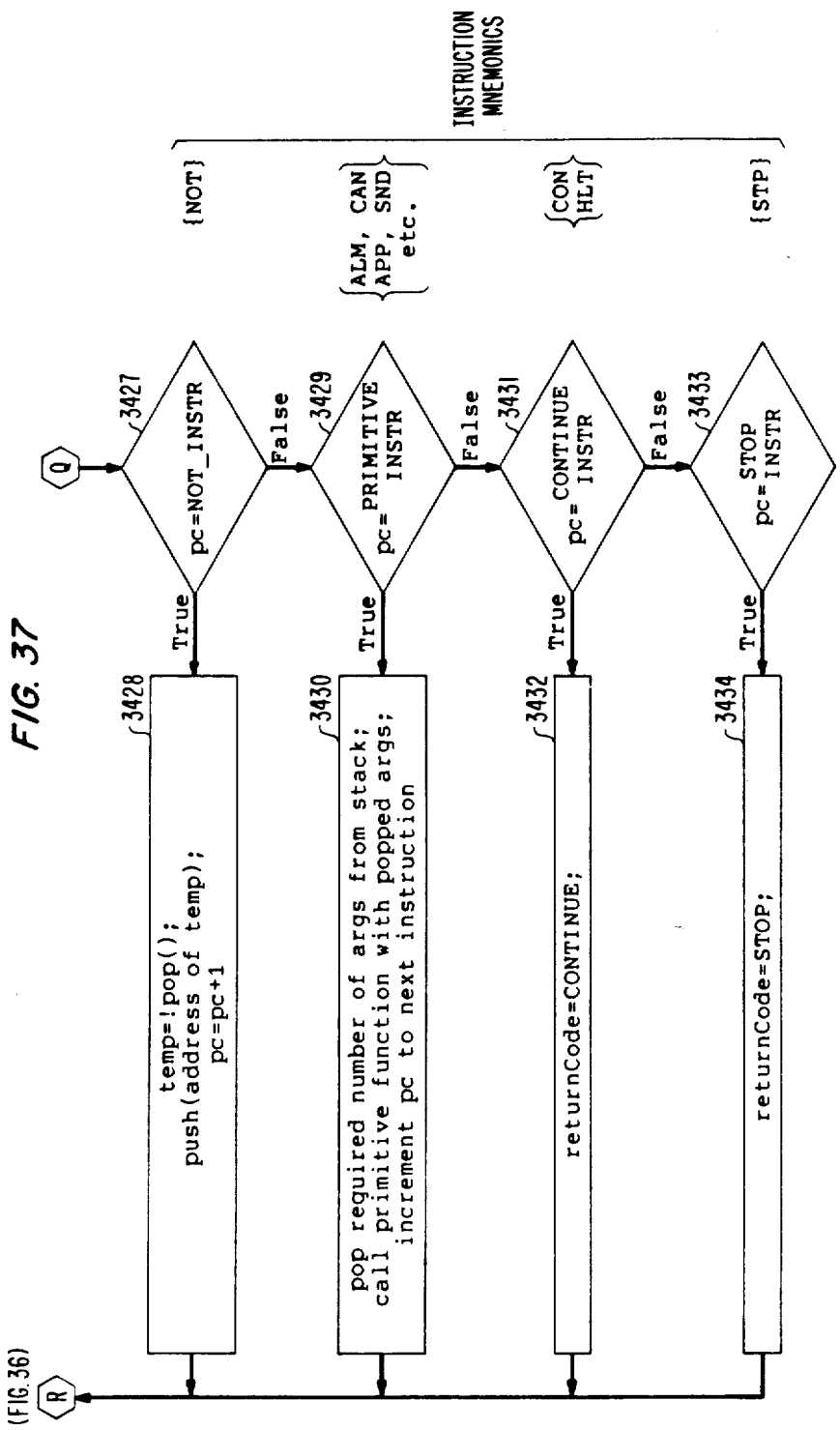

This PUSHTRIPLE function is illustrated in greater detail in FIGS. 32, and 33. When the PUSHTRIPLE function is called, two conditions can exist. The first condition is that the ProgramID table into which the triple is to be placed already exists, and the second condition is that the ProgramID table does not exist. Decision block 3201 makes the determination of which condition exists by checking to see if the designated triple list location, such as in 1113, contains a null value indicating that the ProgramID table does not exist. If the ProgramID table does exist, then block 3202 is executed which creates a new array and sets a TMPLIST pointer to identify the location of the new array. Block 3203 is then executed which inserts the script and triple identification into the first entry of the new array, thus, identifying the compiled triple code in this new array. Block 3204 sets up the initial value of the variable i.

Blocks 3205 through 3207 copy the script and triple identification information from the original ProgramID table into the new array table. Block 3206 copies the script identification information, and block 3207 copies the triple identification information. Once the contents of the ProgramID table have been completely copied into the new array table, block 3208 is executed which inserts the pointer contained in TMPLIST pointer into the triple list location, such as in 1113, thus making the new array the ProgramID table which is pointed to by an entry in the FSMSIGNAL table, such as 1110. In addition, block 3208 also inserts the number of triples that are identified by the new ProgramID table into the location designated as k in the ProgramID table.

FIGS. 34, 35, 36, and 37 illustrate the flowchart for interpreter 1006 of FIG. 10. Source code for the interpreter is illustrated in Appendix D. When control is first passed to interpreter 1006 from FSM 1005, interpreter 1006 sets the RETURNCODE variable equal to UNDEFINED and obtains the location of the first instruction to be interpreted by executing block 3401. After performing these initial functions, interpreter 1006 continually executes blocks 3402 and 3405 so on through 3434 until a HALT, STOP, or CONTINUE instruction is encountered. Once a HALT, STOP, or CONTINUE instruction is encountered, RETURNCODE is set to STOP or CONTINUE (the latter for both HALT and CONTINUE instructions) blocks 3403 and 3404 are executed and control is returned to FSM 1005 along with the RETURNCODE value. As previously noted, the HALT, STOP, or CONTINUE instructions terminate the execution of the coded instructions by resetting the RETURNCODE variable and cause control to be returned to FSM 1005 of FIG. 10.

If RETURNCODE remains equal to UNDEFINED, decision block 3405 is executed to determine whether an unconditional branch instruction is the next instruction to be executed. If the unconditional branch instruction is present, the interpreter stack is popped, and the popped value is stored into the PC variable resulting in the interpreter branching to a new position in the code determined by the popped value. The popped address was originally put on the stack by a branch argument instruction being detected by decision block 3417. Then block 3418 obtains the jump index as was illustrated in FIG. 21, and adds this index to the location of the first instruction address of the code and pushes the result onto the stack.

The execution of a conditional branch instruction is shown in blocks 3406 through 3410. Before the execution of a conditional branch, a branch argument instruction would have been executed placing onto the stack an index to where the branch is to occur. Once a conditional branch instruction is detected by decision block 3406, control is transferred to block 3407 which stores the popped branch address index into a local variable designated as "P". Next, decision block 3408 pops from the stack the address of the TEMP variable which contains the result of a comparison and/or a logical operation that had been placed on the stack by execution of a compare instruction and/or a logical operator instruction as illustrated by blocks 3419 and 3420 and 3425, 3426, 3427, and 3428. If the result of the compare and/or logical operation was true (nonzero), block 3409 is executed causing the branch to occur to the designated place in the code in a manner similar to that performed by block 3438. If the result of the compare and/or logical operation instruction was false (zero), then block 3410 is executed and the next instruction of the compiled code is executed.

If a literal argument instruction is encountered, decision block 3411 transfers control to block 3412. The latter block first obtains the literal ID field from the instruction whose format is illustrated in FIG. 19. The literal ID is utilized to access a literal table containing pointers to a list of literal strings both of which are contained in the script list, such as script list 1206 of FIG. 12. Once the pointer is obtained, it is pushed onto the interpreter stack. Similarly, if a variable argument instruction is encountered, decision block 3413 transfers control to block 3414. Block 3414 functions similarly to 3412 with the exception that the ID field is utilized to index into a local variable table to obtain a pointer to the global variable table. The latter pointer into the global variable table is pushed onto the stack by block 3414. Also, blocks 3415 and 3416 function similarly to blocks 3411 and 3412 in obtaining a pointer to the signal argument from a list of signal arguments maintained on a global basis.

Blocks 3419 and 3420 function to implement the various compare operations by first popping the two values to be compared from the stack and then storing the result of this comparison into a temporary variable. A pointer to this temporary variable is then pushed onto the stack by block 3420. Functions are provided for comparisons based on equal, not equal, greater than, less than, greater than/equal, and less than/equal. Note, that the interpreter may use a number of temporary variables which are freed when the interpreter executes block 3403.

Similarly, blocks 3421 and 3422 function to perform the arithmetic operations of addition, subtraction, multiplication, and division. Blocks 3423 and 3424 function similarly to the arithmetic instructions except that the unary negation function is performed on only one variable. Also, a logical opcode instruction as illustrated by blocks 3425 and 3426 is handled in a manner similar to that of the arithmetic instructions by blocks 3421 and 3422. Similarly, the NOT instruction is handled in a manner similar to the NEGATE instruction and is illustrated in blocks 3427 and 3428.

The execution of primitives, such as SEND, is illustrated by blocks 3429 and 3430. Once a primitive is detected, then the operations shown in block 3430 are performed. Most of the primitives have either no parameters or a fixed number of parameters. Pointers to these parameters have been placed onto the stack by earlier argument instructions and are simply popped off of the stack and passed to the primitive function. However, two types of primitive instructions, ASSIGN and SENDMESSAGE, have a different format. An ASSIGN primitive format is illustrated in FIG. 17. When the ASSIGN instruction is encountered, block 3430 accesses the second field of the instruction to obtain the ID of the variable in the compiled code to set that variable equal to the top value on the stack. The SENDMESSAGE format is illustrated in FIG. 18. First the SENDMESSAGE instruction is encountered and then block 3430 accesses the second field of the instruction illustrated in FIG. 18 to obtain the number of optional parameters to be passed in addition to the two parameters always implied by this instruction. Block 3430 uses this number of optional parameters to determine how many additional arguments to pop from the stack.

The HALT and CONTINUE primitives are implemented by blocks 3431 and 3432. Once the HALT or CONTINUE is detected, control is passed to block 3432 which sets the RETURNCODE equal to CONTINUE. Similarly, when the STOP instruction is detected by decision block 3433, control is passed to 3434 which sets the RETURNCODE equal to stop.

Figure 38:
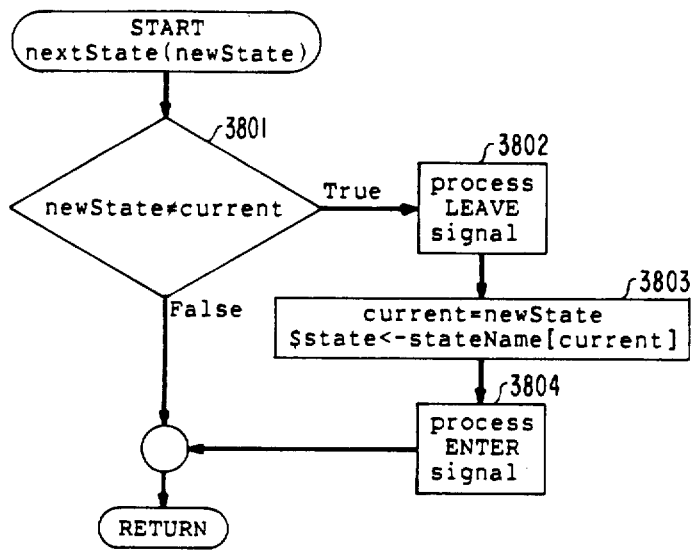
FIG. 38 illustrates, in flowchart form, the NEXT-STATE primitive and, in particular, illustrates the processing of the leave and enter signals.
Figure 39:
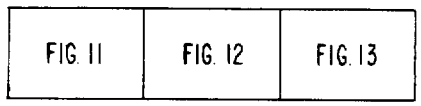
FIG. 39 illustrates how FIGS. 11, 12, and 13 may advantageously be combined.

The NEXTSTATE primitive is illustrated in greater detail in flowchart form, in FIG. 38. Upon invoking the NEXTSTATE primitive, block 3801 first verifies that the state is being modified and, if it is, block 3802 is executed. The latter block sets the $EVENT variable equal to the string "leave" and executes code similar to that illustrated in blocks 2309 through 2312 of FIGS. 23 and 24. This results in the leave signal being processed in the normal manner. After this has been accomplished, block 3803 is executed to change the $STATE variable equal to the string representation for the numerical state code contained in the newState argument and to change the CURRENT variable 1101 to index the entry for the new state in state table 1104. Finally, block 3804 is executed which causes the $EVENT variable to be set equal to the string "enter" and code similar to that illustrated in blocks 2309 through 2312 of FIGS. 23 and 24 is executed resulting in the enter signal being processed for the new state.

In order to further illustrate the manner in which the operations of interpreter 1006 are performed, and in particular, the operations concerned with recovering values for parameters and matching for the event definition, Appendix B is provided. In Appendix B, a script is illustrated that provides the service of allowing data messages to be transmitted from one customer unit to another customer unit. This appendix illustrates this script both in the form of source NPL statements and in the form of compiled code. A bried explanation of the operation of the compiled code is included.

It is to be understood that the above-described embodiment is merely illustrative of the principles of the invention and that other arrangements may be devised by those skilled in the art without departing from the spirit and scope of the invention. In particular, it would be obvious to one skill in the art to have the functions performed by computer 101 performed by each customer unit's computer for that customer unit using known software techniques. In addition, it would be further obvious to have all functions performed by the computers illustrated in FIG. 1 performed by one computer using known software techniques.

APPENDIX A

This appendix details the syntax and the semantics of the NPL language and is included to aid in the understanding of the scripts illustrated in FIGS. 5 and 6 and the datagram script illustrated in Appendix B. It would be obvious to one skilled in the art to extend the basic syntax illustrated in this appendix to include different real-time processes other than telecommunications and also to include any special data communication type functions that might be desirable.

1. PROGRAMMER-DEFINED IDENTIFIERS

The syntax of programmer-defined identifiers is shown in Table 1. The symbol alphanumeric-sequence in Table 1 denotes a letter followed by zero or more letters, digits, or underscore characters. A tilde (~) indicates that no "white space" (blanks or tabs) is permitted.

TABLE 1

| Syntax of programmer-defined identifiers | |
|---|---|
| variable: | $alphanumeric-sequence |
| string: | "characters" |
| name: | alphanumeric-sequence |
| number: | digits |
| alarm: | @alphanumeric-sequence |
| question: | ?alphanumeric-sequence |
| time: | [digit]~digit:digit~digit |

1.1 Variables

Variables are "declared" by their appearance in a triple, and are automatically initialized with a null value. A variable is typeless—it may be assigned the value of any NPL identifier interchangeably. However, the following variables may not be assigned values, since they are predefined as indicated:

| | |
|---|---|
| $state | the name of the local station's current state |
| $event | the name of the local station's current event |
| $this | the four-digit address of the local station |
| $time | the current clock time of the local station |

A variable can be accessed by all the scripts activated in the local station.

1.2 Strings

Strings are used to represent input/output messages and the addresses of subscriber stations. If an output message string contains a variable, the variable will be replaced by its current value when the string is printed on the local station's CRT. Output strings may include the following escape sequences with the indicated result:

| | |
|---|---|
| \n | a newline is printed on the CRT |
| \t | a tab is printed on the CRT |
| \g | the CRT's bell is sounded |
| \\" | the " character is printed on the CRT |

-continued

| | |
|---|---|
| \\\\ | \character is printed on the CRT |

A single backslash ( \ ) may appear in a string at the end of one source code line to indicate continuation of the string to the following line; any leading blanks or tabs on the following line will not be considered part of the string.

1.3 Names

Names are used primarily for script identification. They may also be used for programmer-defined constants such as true and false. Note that constant names have no inherent value.

1.4 Numbers

Numbers represent nonnegative values unless they are preceded by a minus (−) sign, in which case they indicate negative values. (A leading plus sign [+] must not be used to indicate a nonnegative value, since the NPL compiler will treat this as a syntax error.) Only integer-valued numbers are supported in NPL. Note that a string—not a number—is used to denote a subscriber station address.

1.5 Alarms

Alarms are used to identify timers for call features that perform processing related to the passage of time. An alarm is set with the *alarm* primitive (section 6.2), and its expiration is detected as an *alarm* event (section 5).

1.6 Questions

Questions are labels that link program prompts for subscriber input with the subscriber's subsequent responses to those prompts. A question is defined with the *ask* primitive (section 6.2), and is used to match a response with its associated prompt when a *reply* event (section 5) occurs.

1.7 Times

Times denote clock readings in the local station. A 24-hour ("military") clock representation is assumed—no "am" or "pm" designation may appear. Any time identifier signifying a time of day earlier than 10:00 must not have a leading zero (in the "tens place").

2. TONES AND SIGNALS

Table 2 shows NPL keywords for tones that can be produced at the local station, and characterizes the subscriber information that each keyword denotes.

TABLE 2

| NPL tone keywords | |
|---|---|
| Tone | Meaning |
| dialtone | indicates that digits may be entered |
| busytone | indicates the called station is "busy" |
| audible | indicates the called station is "ringing" |
| silence | indicates the called station has "hung up" |
| ringing | indicates that a call has been received |

Note, *silence* replaces *dialtone* when all the digits of a station address have been entered and the return key has been depressed on the local station's keyboard. An "error" tone is not supported but it would be obvious to one skilled in the art to provide such a tone.

Signals may be sent from the local station to indicate its status or to request service from another station. The keywords for signals defined in NPL are shown in Table 3, along with the messages they denote to other stations.

TABLE 3

NPL signal keywords

| Signal | Meaning |
|---|---|
| origin | requests to set up a call to another station |
| query | requests the status of another station |
| busy | indicates the local station is "busy" |
| ringing | indicates the local station is "ringing" |
| answer | indicates the local station has "answered" |
| disconnect | indicates the local station has "hung up" |
| idle | indicates the local station is "idle" |
| notidle | indicates the local station is not "idle" |

NPL does not have keywords for "off-hook" and "on-hook" signals, because they are generated automatically within the system, and need not be "sent" explicitly from the local station to itself. However, NPL does include event keywords to denote the "receipt" of these signals in the local station (see section 5).

3. ARITHMETIC, RELATIONAL, AND LOGICAL OPERATORS

NPL arithmetic, relational, and logical operators are used to form conditional tests and arithmetic expressions. Thus, they may appear only in the action definitions of triples.

The binary arithmetic operators are +, −, *, and /. NPL supports only integer-valued arithmetic; division truncates any fractional part. There is a unary − in NPL, but no unary + is provided. The only NPL identifiers valid as operands in arithmetic expressions are numbers and variables representing number values.

The relational operators of NPL are

| = | != | > | >= | < | <= |
|---|---|---|---|---|---|

(Note the difference between the equality operator of NPL and that of the programming language "C".) Any of the NPL identifiers may be used as operands in expressions involving = or !=, but numbers and number-valued variables are the only identifiers compatible with the other relational operators.

The operators *and*, *or*, and *not* are provided for the formation of logical expressions. The unary negation operator *not* converts a non-zero or "true" operand into 0, and a zero or "false" operand into 1. Numbers and number-valued variables are the only identifiers valid as operands for the logical operators.

The following table summarizes the rules for precedence and associativity of NPL operators. Operators on the same line have the same precedence, and rows are in order of decreasing precedence. Note that NPL operators have precedence and associativity identical to their "C" counterparts. Parentheses may be used to force a higher precedence for expressions involving any of the NPL operators.

| Precedence | Operator | Associativity |
|---|---|---|
| highest | − not | right to left |
| ↑ | * / | left to right |
| ↑ | + − | left to right |
| ↑ | < <= > >= | left to right |
| ↓ | = != | left to right |
| ↓ | and | left to right |
| ↓ | or | left to right |
| lowest | ← | right to left |

4. STATE SPECIFICATIONS

NPL state definitions are constructed using keywords that denote states (current service conditions) of the local station. Table 4 shows the NPL state keywords and the local station conditions they represent.

TABLE 4

NPL state keywords

| State | Meaning |
|---|---|
| idle | "on-hook" and *ringing* tone is not being produced |
| dialing | "off-hook" and *dialtone* is heard in the handset |
| outpulsing | "off-hook" and awaiting a response to an *origin* |
| busy | "off-hook" and *busytone* is heard in the handset |
| audible | "off-hook" and *audible* is heard in the handset |
| talking | "off-hook" and a voice connection is established |
| disconnect | "off-hook" and *silence* is heard in the handset |
| ringing | "on-hook" and *ringing* tone is being produced |

NPL provides two state specification operators for including multiple states in one triple: *or* indicates a union of states, and *not* denotes the complement of a state relative to the set of eight NPL states. The *not* operator may be combined with the *or* operator to specify the complement of a union of states, in which case the NPL compiler expects the state union expression to be enclosed in parentheses. Complementation of a single state does not require parentheses.

A state specification may consist solely of the keyword abbreviation *all* to represent every state of the local station. A state complement or union using *all* is treated by the compiler as an error.

The following are examples of valid state specifications:

state: talking
state: outpulsing or audible
state: not idle
state: not (idle or dialing or ringing)
state: all

5. EVENT SPECIFICATIONS

NPL event specifications are formed from keywords denoting the events that may trigger actions at the local station. A fixed-format argument list may appear with an event keyword, to retrieve information associated with the corresponding system event, or to specify a restriction on the event conditions for which an action is triggered. Any event keyword may be used without an argument list if it is desired to "catch" a system event unconditionally without collecting more information.

Four event keywords never have an argument list, because they represent local station events that do not carry any additional information:

*off-hook:* the handset has been removed from its switchhook

*on-hook:* the handset has been returned to its switchhook

*leave:* the previous "current state" has just been left

*enter:* the successor "current state" has just been entered

Two other event keywords are also used without arguments, because their context determines the conditions for which their associated actions are triggered:

activate
deactivate

The *activate* (*deactivate*) event keyword denotes that the local station has received a message to activate (deactivate) a particular script. If the message names the script in which *activate* (*deactivate*) is contained, the action associated with the event keyword is triggered. The *activate* event keyword is used in a script triple to set up conditions that must exist before the execution of the script's other triples. The *deactivate* event keyword is used in a script triple to trigger any cleanup activities that must be performed before the script's deactivation. The *activate (deactivate)* event keyword is a companion to the *activate (deactivate)* primitive (section 6.2).

Each of the following event keywords denotes that the local station has received the NPL signal of the same name (see Table 3). The address of the station that sent the signal is automatically assigned to source-variable. Brackets indicate optional syntactic elements, i.e., 0 or 1 occurrence.

*origin* [(source-variable)]
*query* [(source-variable)]
*busy* [(source-variable)]
*ringing* [(source-variable)]
*answer* [(source-variable)]
*disconnect* [(source-variable)]
*idle* [(source-variable)]
*notidle* [(source-variable)]

The *digits* event keyword denotes that the local station has collected a valid station address dialed by a subscriber. The address is saved in address-variable.

*digits* [(address-variable)]

Each of the remaining event keywords triggers an action only when the indicated system event occurs and a tag carried with the system event matches an argument provided with the event keyword.

The *alarm* event keyword denotes that a programmer-defined alarm has "timed out" in the local station. An alarm identifier or variable alarm-tag is matched against the identity of the alarm that expired.

*alarm* [(alarm-tag)]

The *alarm* event keyword is a companion to the *alarm* primitive (section 6.2).

The *time* event keyword signifies that the local station's internal clock has advanced by one minute. A time identifier or variable time-tag is matched against the new clock reading.

*time* [(time-tag)]

Note that *time* triggers its action once each minute if time-tag is the predefined variable $time (section 1.1).

The *input* event keyword denotes that a subscriber has typed an input message string (command) at the local station's keyboard. A string identifier or variable input-tag is matched against the subscriber's input message string. If there is a match, each other-input variable is assigned in turn with the next blank-separated string typed on the same input line. Curly braces indicate 0 or more occurrences of the enclosed syntactic elements.

*input* [(input-tag{, other-input})]

The *reply* event keyword denotes that a subscriber has typed a reply to a prompt for information. A question identifier or variable question-tag is matched against the question label for the prompt that was displayed. If there is a match, the first string in the subscriber's reply is assigned to reply-variable, and each other-reply variable is assigned in turn with the next blank-separated string typed on the same input line.

*reply* [(question-tag, reply-variable{, other-reply})]

The *reply* event keyword is a companion to the *ask* primitive (section 6.2).

The *rcvmessage* event keyword denotes that the local station has received a message string sent from another station. A string identifier or variable message-tag is matched against the message string that was received. If there is a match, source-variable is assigned the address of the station that sent the message, and each other-message variable is assigned in turn with an additional message string that may have been received.

*rcvmessage* [(source-variable, message-tag{, other-message})]

The *rcvmessage* event keyword is a companion to the *sendmessage* primitive (section 6.2).

A triple's action can be triggered by more than one event if the eventspecification operator *or* is used in the triple to denote a union of events. NPL has no event specification operator for complementation.

The following are examples of valid event specifications:

*event:* input ("#", $CFnumber)
*event:* origin ($source) or query ($source)
*event:* reply (?CFforward, $CFreply)
*event:* time (8:00)
*event:* rcvmessage ($source, "pickup denied")

6. ACTION SPECIFICATIONS

An action specification consists of zero or more assignment statements, primitives, or conditional statements, followed by zero or one directive. At least one of these components must be present in every action specification.

6.1 Assignment

The NPL assignment statement has the following syntax:

variable←expression

The variable must be a programmer-defined variable, while expression may be a variable, a nonvariable identifier (alarm, string, number, etc.), a state keyword, a tone keyword, a signal keyword, or combinations of these formed into a valid arithmetic, relational, or logical expression.

6.2 Primitives

NPL primitives do not return values—they are simply interfaces to lower-level routines that perform specific tasks. The arguments provided with primitives must follow a fixed format with respect to type and order of appearance.

*apply* (tone[, duration])
*remove* (tone)

The *apply* primitive causes tone to be generated at the local station either continuously or for an interval given (in tenths of a second) by the optional duration expression. The *remove* primitive stops tone from being generated at the local station. If tone is already (not currently) being produced, the *apply (remove)* primitive is ignored. A tone keyword (see Table 2) or a variable may be used to represent tone.

*send* (station-address, signal)

The *send* primitive transmits signal from the local station to another station-address. A signal keyword (see Table 3) or a variable may be used to represent signal; station-address may be a string identifier or a variable.

*print* (output)

The *print* primitive displays an output string on the local station's CRT screen. The primitive interprets escape sequences and evaluates variables that are contained in output (see section 1.2). A string identifier or a variable may be used to represent output.

*engage* (station-address)
*disengage*

The *engage (disengage)* primitive sets up (takes down) a one-way voice connection from the local station to another station-address. If a voice connection is already (not currently) established from the local station, the *engage (disengage)* primitive is ignored. A string identifier or a variable may be used to represent station-address; *disengage* needs no argument. Note that the local station and the remote station must each execute an *engage* (*disengage*) primitive to establish (dismantle) a two-way voice connection between them.

*dial* (station-address)

The *dial* primitive automatically originates a call from the local station to another station-address. The primitive is useful for originating a call when the local station is not in the *dialing* state, or for dialing a station-address saved previously (e.g. by a "last number redial" call feature). A string identifier or a variable may be used to represent station-address.

*forward* (destination-address, source-address, signal)

The *forward* primitive passes to destination-address an *origin* or *query* signal received at the local station from source-address. Any signal other than *origin* or *query* produces an error when *forward* is executed. A signal keyword (see Table 3) or a variable may be used to represent signal; destination-address and source-address may each be a string identifier or a variable.

*alarm* (alarm-tag, duration)

The *alarm* primitive creates an alarm called alarm-tag that is set to "time out" after an interval specified (in tenths of a second) by the duration expression. Multiple *alarm* primitives that use the same alarm-tag will cause independent timers to be created, each of which is identified by alarm-tag. An alarm identifier or a variable may be used to represent alarm-tag.

*ask* (question-tag, prompt, duration)

The *ask* primitive prints uns/prompt/ on the local station's CRT to ask the subscriber for an input response. The prompt is displayed for an interval specified (in tenths of a second) by the duration expression. A question-tag labels prompt so it can be associated with its subscriber response later. A question identifier or a variable may be used to represent question-tag; prompt may be a string identifier or a variable. The *ask* primitive interprets escape sequences and evaluates variables that are contained in prompt (see section 1.2).

*cancel* (alarm-or-question-tag)

The *cancel* primitive revokes an alarm or a subscriber prompt identified by alarm-or-question-tag. If alarm-or-question-tag is not currently set/displayed, the *cancel* primitive is ignored. An alarm identifier, a question identifier, or a variable may be used to represent alarm-or-question-tag. If alarm-or-question-tag identifies an alarm, *cancel* rescinols all existing alarms associated with alarm-or-question-tag.

*sendmessage* (station-address, message-tag{, other-message})

The *sendmessage* primitive communicates a programmer-defined message-tag and each instance of other-message from the local station to another station-address. A string identifier or a variable may be used to represent each of station-address, message-tag, and other-message.

*activate* (script)

*deactivate* (script)

The *activate* (*deactivate*) primitive activates (deactivates) the triples of script in the local station. If script is not stored in the local station, *activate* (*deactivate*) produces a message indicating script's absence; if script is already active (stored but not currently active), *activate* (*deactivate*) is ignored. If *activate* is executed and script contains a triple matching the local station's current state and event, the triple is not a candidate for execution until the next time the same state and event occur. If *deactivate* is executed and script contains a triple specifying the *deactivate* event keyword (section 5) and the current state along with the *stop* directive (section 6.3), then script can be deactivated only by a *purge* directive (section 6.3) in script; otherwise, script is deactivated directly by the *deactivate* primitive. A name identifier or a variable may be used to represent script.

6.3 Directives

A directive may appear only as the last executable statement in an action specification. The directive *nextstate* was described with respect to FIG. D and *continue* and *stop* were described with respect to FIG. 15.

nextstate (state)
continue
stop

A state keyword (see Table 4) or a variable may be used to represent state. If state is the same as the current state, the FSM controller will not execute triples that specify the *leave* or *enter* events.

One other directive plays a limited role in NPL:

purge

The *purge* directive causes an unconditional deactivation of its containing script. It is essential in any script having a triple that specifies the *deactivate* event keyword (section 5) with the *stop* directive, since it is the only mechanism for finally deactivating such a script. The *purge* directive must be used with care to avoid the confusion that could arise from the unexpected deactivation of a script.

6.4 Conditionals

NPL conditional statements have the following syntax:

---

*if* ( expression )
    *then* action specification
    [ *else* [ action specification ] ]
*endif*

---

The conditional test expression must have either a "true" (logical nonzero) or a "false" (logical zero) evaluation, and must be enclosed in parentheses. Note that a conditional is defined recursively: an action specification may itself contain other conditionals, as well as assignments, primitives, and directives.

APPENDIX B

An example of a datagram script is given in this appendix to further clarify the operations of interpreter 1006. The datagram script allows for the transmission of data messages from one customer unit to another customer unit. The datagram script is first given in the form of NPL statements and then the compiled code is illustrated. Within the compiled code, the mnemonics for the various instructions are illustrated rather than the actual compiled code to allow ease of comprehension. The actual compiled code would have numerical values in accordance with Table III.

The first portion of the compiled format of the script up to the part labeled "first triple" is stored in a script list such as script list 1206 of FIG. 12. The second triple demonstrates the matching that is performed within the coded part of a triple to determine if the input event matches the present signal being received. The test to ascertain whether or not the input matches ":" is performed by the first 5 bytes of the instruction part of the second triple. If the customer input string is not ":", then a jump is made to the twenty-first byte which is a HALT instruction that sets RETURNCODE equal to CONTINUE and returns control to FSM 1005. Instruction bytes 0 and 1 obtain the literal argument for the ":"

string which is accessed by literal id "2" and place a pointer to this literal argument on the stack. The next two instruction bytes obtain the pointer to the first signal argument for the input event definition and push this on the stack also. Instruction byte 4 pops the two pointers from the stack, obtains the values pointed to by those two pointers, and compares those values. If the first input event signal argument contains a ":", a "1" is pushed onto the stack by this fifth instruction byte, otherwise, a "0" is pushed onto the stack. Instruction byte 5 pushes an address index having a decimal value of 21 which designates the last instruction, HALT, of the triple. If the jump is not performed to the HALT instruction, then instruction bytes 8 and 9 are interpreted to obtain the pointer to the second signal argument of the input event which is the information to be stored in the $DATAGRAM variable. Instruction bytes 10 and 11 are interpreted to obtain a pointer to the $DATAGRAM variable to assign the information of the second signal argument in the input event to this variable which is in the global variable table. The remainder of the instruction bytes of the second triple then obtain the parameters for the SENDMESSAGE primitive which is executed by instruction bytes 18 and 19. Instruction byte 20 causes the RETURNCODE to be set equal to STOP and returns control to the interpreter. The compiled instructions for the third triple illustrate the use of the "if" conditional in conjunction with the STOP and CONTINUE primitives.

NPL STATEMENTS

| | |
|---|---|
| script: | datagram |
| state: | all |
| event: | activate |
| action | print ("Enter ':' to send datagram \n") |
| state: | talking |
| event: | input (":", $datagram) |
| action: | sendmessage ($otherparty, "datagram", $datagram) |
| | stop |
| state: | talking |
| event: | rcvmessage ($source, "datagram", $datagram) |
| action: | if ($source = $otherparty) |
| | then print |
| | ("\greceived from $source at $time: $datagram \n") |
| | stop |
| | else continue |
| | endif |

COMPILED FORMAT OF "datagram.n" SCRIPT

| | |
|---|---|
| 001 | number of bytes in remainder of script: |
| 112 | ((octal) 1 << 7) + (octal) 112 = (decimal) 202 |
| 005 | number of literals in script = (decimal) 5 |
| id | literal strings (represented character-by-character) |
| 0 | d a t a g r a m \0 |
| 1 | E n t e r ' : ' t o  s e n d  d a t a g r a m \n \0 |
| 2 | : \0 |
| 3 | d a t a g r a m \0 |
| 4 | \g r e c e i v e d  f r o m \2  a t \3 : \0 \n \0 |
| 004 | number of variables in script = (decimal) 4 |
| id | variable string (represented character-by-character) |
| 0 | $ d a t a g r a m \0 |
| 1 | $ o t h e r p a r t y \0 |
| 2 | $ s o u r c e \0 |
| 3 | $ t i m e \0 |
| 003 | number of triples in script = (decimal) 3 |

FIRST TRIPLE

| | |
|---|---|
| 000 | total number of bytes in this triple: |
| 021 | ((octal) 0 << 7) + (octal) 21 = (decimal) 17 |
| 010 | number of states = (decimal) 8 |
| 000 | id for idle state |
| 001 | id for ringing state |
| 002 | id for talking state |
| 003 | id for disconnect state |
| 004 | id for dialing state |
| 005 | id for busy state |
| 006 | id for audible state |
| 007 | id for outpulsing state |
| 020 | id for activate event |

| pc | instruction | |
|---|---|---|
| 0 | LAR 001 | push pointer to literal 3 on stack |
| 2 | PRI | call print with popped stack item |
| 3 | STP | returnCode = STOP; exit interpreter loop |
| 4 | HLT | returnCode = CONTINUE; exit interpreter loop |

SECOND TRIPLE

| | |
|---|---|
| 000 | total number of bytes in this triple: |
| 033 | ((octal) 0 << 7) + (octal) 33 = (decimal) 27 |
| 001 | number of states = (decimal) 1 |
| 002 | id for talking state |
| 014 | id for input event |

| pc | instruction | |
|---|---|---|
| 0 | LAR 002 | push pointer to literal 2 on stack |
| 2 | SAR 000 | push pointer to signal argument 0 on stack |
| 4 | NEQ | push result of [pop( ) != pop( )] on stack |
| 5 | BAR 025 | push pc address (decimal) 21 on stack |
| 7 | BRC | conditionally jump to address popped from stack |
| 8 | SAR 001 | push pointer to signal argument 1 on stack |
| 10 | ASN 000 | assign popped stack item to variable 0 |
| 12 | VAR 001 | push pointer to variable 1 on stack |
| 14 | LAR 003 | push pointer to literal 3 on stack |
| 16 | VAR 000 | push pointer to variable 0 on stack |
| 18 | SNM 001 | call sendmessage with 3 popped stack items |
| 20 | STP | returnCode = STOP; exit interpreter loop |
| 21 | HLT | returnCode = CONTINUE; exit interpreter loop |

THIRD TRIPLE

| | |
|---|---|
| 000 | total number of bytes in this triple: |
| 047 | ((octal) 0 << 7) + (octal) 47 = (decimal) 39 |
| 001 | number of states = (decimal) 1 |
| 002 | id for talking state |
| 013 | id for rcvmessage event |

| pc | instruction | |
|---|---|---|
| 0 | LAR 003 | push pointer to literal 3 on stack |
| 2 | SAR 001 | push pointer to signal argument 1 on stack |
| 4 | NEQ | push result of [pop( ) != pop( )] on stack |
| 5 | BAR 041 | push pc address (decimal) 33 on stack |
| 7 | BRC | conditionally jump to address popped from stack |
| 8 | SAR 000 | push pointer to signal argument 0 on stack |
| 10 | ASN 002 | assign popped stack item to variable 2 |
| 12 | SAR 002 | push pointer to signal argument 2 on stack |
| 14 | ASN 000 | assign popped stack item to variable 0 |
| 16 | VAR 002 | push pointer to variable 2 on stack |
| 18 | VAR 001 | push pointer to variable 1 on stack |
| 20 | EQL | push result of [pop( ) == pop( )] on stack |
| 21 | NOT | push result of [!pop( )] on stack |
| 22 | BAR 040 | push pc address (decimal) 32 on stack |
| 24 | BRC | conditionally jump to address popped from stack |
| 25 | LAR 004 | push pointer to literal 4 on stack |
| 27 | PRI | call print with popped stack item |
| 28 | STP | returnCode = STOP; exit interpreter loop |
| 29 | BAR 041 | push pc address (decimal) 33 on stack |
| 31 | BRU | unconditionally jump to address popped from stack |
| 32 | CON | returnCode = CONTINUE; exit interpreter loop |
| 33 | HLT | returnCode - CONTINUE; exit interpreter loop |

What is claimed is:

1. A method for controlling state transitions in response to a plurality of signals in a voice and data telecommunication system having a plurality of system states and with control being performed by a computer executing a program written in a nonprocedural language and said program controls said system to provide a plurality of features each providing specific voice and data operations and each feature implemented by a set of groups of instructions with each group of instructions being actuated by a predefined one of said signals and said system being in a predefined one of said sytem states, comprising the steps of:

initiating a change from the present one of said system states to another one of said system states by the execution of an instruction of a first group of instructions;

generating a leave signal to define preparation to exit from said present one of said states;

performing common exit operations terminating said present one of said system states before leaving said present one of said system states by the execution of a second group of instructions in response to said leave signal and said system being in said present one of said states;

generating an enter signal to define preparation to enter into said other one of said states; and performing common entrance operations to start said other one of said system states upon entering said other one of said system states by a third group of instructions actuated by said enter signal and said system being in said other one of said system states.

2. The method of claim 1 wherein each of said group of instructions comprises an event definition defining the actuating signal and a state definition defining the actuating one of said sytem states and occurrence of the defined signal in the defined state causes the actuation of said group of instructions and each of said group of instructions identifiable by the defining actuating signal and the defined one of said system states and said step of performing said common exit operations comprises the steps of:

finding said second group of instructions on the basis of said leave signal and said present state; and executing said common exit operations by the execution of instructions from said second group of instructions.

3. The method of claim 2 wherein said step of executing said common exit operations further comprises the steps of:

finding a fourth group of instructions responsive to said leave signal and said present one of said system states upon execution of instructions from said second group of instructions; and executing additional common exit operations to terminate said present one of said states by the execution of instructions from said fourth group of instructions.

4. The method of claim 3 wherein said step of executing additional instructions comprises the step of stopping execution of other groups of instructions being actuated by said leave signal and said system being in said present one of said system states by execution of one instruction of said fourth group of instructions.

5. The method of claim 2 wherein said step of performing the common entrance operations comprises the steps of:

finding said third group of instructions on the basis of the enter signal and said other one of said system states; and executing said common entrance operations by instructions of said third group of instructions.

6. The method of claim 5 wherein said step of executing said common entrance operations further comprises the steps of:

finding a fifth group of instructions responsive to said enter signal and said other one of said system states upon execution of an instruction from said third group of instructions; and executing additional common entry operations to start said other one of said system states by execution of instructions from said fifth group of instructions.

7. The method of claim 6 wherein said step of executing said additional common entrance operations further comprises the step of stopping execution of other groups of instructions responsive to said enter signal and said system being in said other one of said system states.

8. A method for controlling state transitions in response to a plurality of signals in a real-time process having a plurality of process states with control being performed by a computer executing a program written in a nonprocedural language and said program providing a plurality of operations each implemented by a set of groups of instructions with each group of instructions responsive to a predefined one of said process states and one of said signals for actuation, comprising the steps of:

initiating a change from the present one of said process states to another one of said process states by the execution of an instruction of a first group of instructions;

generating a leave signal to define preparation to exit from said present one of said process states;

performing common exit actions to terminate said present one of said process states before leaving said present one of said process states by execution of a second group of instructions in response to said leave signal and said present one of said process states;

generating an enter signal to define preparation to enter said other one of said process states; and performing common entrance actions to define preparation to enter said other one of said process states by a third group of instructions in response to said enter signal and said other one of said process states.

9. A method for controlling state transitions in response to a plurality of signals in a voice and data telecommunication system having a plurality of system states with control being performed by a computer executing a program comprising a finite state machine routine and sets of groups of instructions with each set of said groups of instructions providing a feature that provides specific voice and data operations in said system and each group of instructions being actuated by a predefined one of said signals and said system being in a predefined one of said system states and said computer having a memory for storage of a plurality of control structures each associated with one of said system states and each control structure comprises a plurality of tables each associated with an individual one of said plurality of signals, and said method comprises the steps of:

maintaining an individual one of said control structures for each of said system states;

allocating in each of said control structures an individual one of corresponding tables of the control system for each signal occurring in the system state corresponding to the control structure;

relating individually in each of said tables in preference order ones of groups of instructions actuated by the signal corresponding to the individual table and the system state corresponding to the control structure of which the corresponding individual table is part;

initiating a change from the present one of said system states to another one of said system states by execution of a first group of instructions;

generating a leave signal to define preparations to exit from said present one of said system states by execution of said finite state machine routine;

identifying a first one of said tables in response to said present one of said sytem states and said leave signal by further execution of said finite state machine routine;

executing the group of instructions having highest preference in said first identified table to perform common exit operations to terminate said present one of said system states;

generating an enter signal to define preparations to enter into said other one of said system states by execution of said finite state machine routine;

identifying a second one of said tables in response to said other one of said system states and said enter signal; and executing the group of instructions having highest preference in said second identified table upon entering into said other one of said system states to perform common entrance operations to start said other one of said system states.

10. The method of claim 9 wherein said step of executing said group of instructions of said first identified tables further comprises the step of:

executing the group of instructions having second highest priority in said first identified table to perform additional common exit operations to terminate said present one of said system states in response to continued processing of said leave signal.

11. The method of claim 10 wherein said step of executing said second highest preference group of instructions of said first identified table further comprises the step of:

terminating the processing of said leave signal thereby blocking the execution of the group of instructions having the third highest preference.

12. The method of claim 9 wherein said step of executing said highest preference group of instructions in said second identified table further comprises the step of:

executing the group of instructions having second highest preference in said second identified table to perform additional common entrance operations.

13. The method of claim 12 wherein said step of executing the second highest preference group of instructions in said second identified table further comprises the steps of terminating the processing of said enter signal thereby blocking the execution of the third highest preference group of instructions in said second identified table.

14. A voice and data telecommunication system controlled by a computer in response to a plurality of signals from said system and said system having a plurality of states and said computer executing a program comprising a finite state machine routine and sets of groups of instructions with each set of said groups of instructions providing a feature on said system and each group of instruction being actuated by a predefined one of said signals and said system being in a predefined one of said system states, comprising:

means for initiating a change from the present one of said system states to another one of said system states;

means for generating a leave signal to define preparation to exit from said present one of said system states;

means for performing common exit operations to terminate said present one of said system states before leaving said present one of said system states in response to said leave signal and said system being in said present one of said system states;

means for generating an enter signal to define preparation to enter said other one of said system states; and means for performing common entrance operations to start said other one of said system states upon entering into said other one of said states in response to said enter signal and said system being in said other one of said system states.

15. The system of claim 14 wherein said means for performing said common exit operation comprises means for continuing the processing of said leave signal; and means responsive to the continued processing of said signal for performing additional common exit operations to define preparation exit from said present one of said system states.

16. The system of claim 15 wherein said performing means further comprises means for terminating further processing of said leave signal thereby inhibiting other means actuated by said leave signal and said present state.

17. The system of claim 16 wherein said means for performing said common entrance operation further comprises means for continuing the processing of said enter signal;

means responsive to the continued processing of said enter signal for finding another means responsive to said enter signal and said other state; and said other means responsive to said enter signal and said other one of said system states for performing additional common entry operations to start said other one of said system states.

18. The system of claim 17 wherein said means for performing additional common entrance operations comprises means for terminating further processing of said enter signal thereby blocking execution of other means actuated by said enter signal and said system being in said other one of said system states.

19. A computer for controlling a real-time process having a plurality of states and a plurality of signals causing state transitions and said computer executing a program comprising a finite state machine routine and sets of groups of instructions with each set of said groups of instructions controlling an operation in said process and each group of instructions being actuated by a predefined signal and said process being in a predefined one of said process states, comprising:

means for initiating a change from the present process state to another process state defined by the execution of a first group of instructions;

means defined by said finite state machine routine for generating a leave signal to define preparation to exit from said present one of said process states;

means defined by a second group of instructions for performing common exit operations to terminate said present one of said process states before leaving said present one of said process states in response to said leave signal and said present one of said process states;

means further defined by said finite state machine routine for generating an enter signal to define preparations to enter into another one of said process states; and means defined by execution of a third group of instructions for performing common entrance upon entering into said other one of said process states in response to said enter signal and said process being in said other one of said process states.

* * * * *